United States Patent
Henkel et al.

(10) Patent No.: US 8,456,355 B2
(45) Date of Patent: Jun. 4, 2013

(54) PARTIAL AMBIGUITY FIXING FOR MULTI-FREQUENCY IONOSPHERIC DELAY ESTIMATION

(75) Inventors: Patrick Henkel, Emmering (DE); Victor Gomez, Haar (DE)

(73) Assignee: DLR Deutsches Zentrum für Luft- und Raumfahrt e.V. (DE)

( * ) Notice: Subject to any disclaimer, the term of this patent is extended or adjusted under 35 U.S.C. 154(b) by 201 days.

(21) Appl. No.: 12/901,170

(22) Filed: Oct. 8, 2010

(65) Prior Publication Data

US 2011/0109503 A1    May 12, 2011

(30) Foreign Application Priority Data

Oct. 8, 2009 (EP) .................................. 09172607

(51) Int. Cl.
*G01S 19/44* (2010.01)
(52) U.S. Cl.
USPC .................................................. 342/357.27
(58) Field of Classification Search
USPC ............. 342/357.26, 357.27, 357.38, 357.68; 701/479, 480
See application file for complete search history.

(56) References Cited

U.S. PATENT DOCUMENTS

2005/0101248 A1    5/2005   Vollath
2008/0297408 A1    12/2008  Dai et al.

FOREIGN PATENT DOCUMENTS

EP    1972959 A1    9/2008

OTHER PUBLICATIONS

Lawrence, D.: "A New Method for Partial Ambiguity Resolution", Proceedings of the Institute of Navigation. Ion. National Technical Meeting, Jan. 26, 2009, pp. 652-663, XP007912883.
Mc Graw, G. and Young, P.: "Dual Frequency Smoothing DGPS Performance Evaluation Studies", Proc. of Ion National Technical Meeting, San Diego (CA), USA, pp. 16-24, Jan. 2005.
P. Hwang, G. Graw and J. Bader, "Enhanced Differential GPS Carrier-Smoothed Code Processing Using Dual Frequency Measurements", J. of Navigation, vol. 46, No. 2, pp. 127-137, Summer 1999.
European Search Report; Application No. EP 09 17 2607; May 18, 2010; 8 pages.
Teunissen, P., Joosten, P. and Tiberius, C..: "Geometry-free Ambiguity Success Rates in Case of Partial Fixing", Proceedings of the 1999 National Technical Meeting of the Institute of Navigation, US, Jan. 25, 1999, pp. 201-207, XP002497085.
Brown, R. and Hwang, P.: "Introduction to random signals and applied Kalman filtering", 3rd edition, John Wiley and Sons, New York, 1997.
C. Günther and P. Henkel, "Reduced noise, ionosphere-free carrier smoothed code", accepted for IEEE Transactions on Aerospace and Electronic Systems, pp. 323-334, 2008.
R. Hatch, "The Synergism of GPS Code and Carrier Measurements", Proc. Third Intern. Geodetic Symp. On Satellite Doppler Positioning, New Mexico, II, pp. 1213-1232, 1982.
P. Hwang, G. Graw and J. Bader, Enhanced Differential GPS Carrier-Smoothed Code Processing Using Dual-Frequency Measurements, J. of Navigation, vol. 46, No. 2, pp. 127-137, Summer 1999.

(Continued)

*Primary Examiner* — Dao Phan
(74) *Attorney, Agent, or Firm* — St. Onge Steward Johnston & Reens LLC

(57) ABSTRACT

A method is suggested for robust estimation of a subset of carrier phase integer ambiguities for precise ionospheric delay estimation. The advantages of this method are the precise estimation of receiver and satellite biases, an increase in the number of reliably fixable ambiguities, and an improved accuracy for the ionospheric delay estimation.

19 Claims, 12 Drawing Sheets

OTHER PUBLICATIONS

S. Schlötzer, High integrity carrier phase based relative positioning for precise landing using a robust nonlinear filter, Master Thesis, Technische Universität München, 174 pp, Feb. 2009.

P. Teunissen, Integer estimation in the presence of biases, Journal of Geodesy, vol. 75, pp. 399-407, 2001.

C. Günther and P. Henkel, Reduced noise, ionosphere-free carrier smoothed code, accepted for IEEE Transactions on Aerospace and Electronic Systems, 2008.

R. Hatch, The Synergism of GPS Code and Carrier Measurements, Proc. Third Intern. Geodetic Symp. on Satellite Doppler Positioning, New Mexico, II, pp. 1213-1232, 1982.

PARTIAL AMBIGUITY FIXING FOR MULTI-FREQUENCY IONOSPHERIC DELAY ESTIMATION

CROSS-REFERENCE TO RELATED APPLICATIONS

This present application claims priority of European patent application No. 09 172 607.5 filed on Oct. 8, 2009, the disclosure of which is hereby incorporated by reference it its entirety as part of the present disclosure.

FIELD OF THE INVENTION

The invention relates to a method for determining phase components of a carrier signal emitted by satellites of a satellite navigation system, comprising the acts:
  the carrier signals are received from various satellites by a user system
  the integer phase ambiguities of the carrier signals received from the satellites are resolved in a fixing sequence selected according to an optimization criterion.
The invention further relates to a user system for navigation.

BACKGROUND OF THE INVENTION

Such a method and such a user system is known from EP 1 972 959 A1. According to the known method the carrier signals of a global navigation satellite system are processed using linear combinations of the carrier signals for estimating the phase ambiguities and the ionospheric error. Since the ionospheric error is known, the position of the user system can be determined absolutely without using parallel measurements of a reference station.

The known method applies to global navigation satellite system with at least three carriers, such as triple frequency GPS and multi-frequency Galileo measurements. The higher number of frequencies and the optimized modulation of the new Galileo signals and the GPS L5 signal will reduce the noise variance. However, the inherent disadvantages for partial ambiguity resolution are not mitigated. One of them is the current maximization of the reliability of the first fix instead of the maximization of the number of reliably fixable ambiguities. Another drawback is that systematic errors have not been taken into account for the search of the optimal fixing order.

The dispersive behaviour of the ionosphere in the L band can also be estimated within GPS. Currently, the ionospheric delay is estimated from GPS L1 and L2 code measurements which are BPSK modulated. This modulation centers the power around the carrier frequency, i.e. the power spectral density is substantially lower at the band edges than at the band center. This results in a larger Cramer Rao bound than other modulations and, thus, an increased code noise. The increased code noise as well as multipath errors are further amplified by the linear combination for ionospheric delay estimation. A rough estimate is obtained by a simple L1-L2 code-only combination. The weighting coefficients of the dual frequency combination are chosen such that the true range and the non dispersive errors (clock offsets and tropospheric delay) are eliminated and only the ionospheric delay is preserved. The weighting coefficients of a dual frequency code only combination are unambiguously given by the geometry-free and ionosphere preserving constraints. Therefore, there is no degree of freedom to minimize the noise variance. An ionospheric delay estimation with GPS L1 and L2 code measurements therefore requires an ionosphere-free carrier smoothing with large time constants and large filter initialization periods to achieve a centimeter accuracy.

The carrier phase measurements can also be used for positioning and ionospheric delay estimation in addition to the code measurements. The carrier phase measurements are about three orders of magnitude more accurate than code measurements. However, they are ambiguous as the fractional phase of the initial measurement does not provide any information on the integer number of cycles (called integer ambiguity) between the receiver and the satellite.

A ionosphere-free carrier smoothing is a widely used method to reduce the code noise by carrier phase measurements without resolving their ambiguities. A centimeter accuracy for the ionospheric delay estimation can be achieved with time constants and filter initialization periods of several minutes.

An even higher accuracy of the ionospheric delay estimation requires the resolution of the carrier phase integer ambiguities. The reliable resolution of all ambiguities can not be achieved under severe multipath conditions, especially affecting low elevation satellites, such that the fixing is limited to a subset of ambiguities (=partial fixing). There exist various approaches for the estimation of integer ambiguities, e.g. the synchronous rounding of the float solution, a sequential fixing (=bootstrapping), an integer least squares search or integer aperture estimation.

The synchronous rounding of the float solution is the most simple method. However, it does not consider the correlation between the real valued ambiguity estimates which results in a lower success rate and a lower number of reliable fixes than other methods. Moreover, there does not exist an analytical expression for the success rate which has to be determined by extensive Monte Carlo simulations.

The sequential ambiguity fixing (bootstrapping) is another very efficient method that takes the correlation between the float ambiguities into account and, therefore, enables a substantially lower probability of wrong fixing. Another advantage is that the success rate can be computed analytically. However, this success rate and the number of reliably fixable ambiguities depend strongly on the chosen order of fixings. The optimization of the fixing order becomes especially important for geometries with a high number of visible satellites. A drawback of the sequential ambiguity fixing (bootstrapping) is that the success rate is slightly lower than for integer least squares estimation.

The third approach, the integer least square estimation, maximizes the success rate for unbiased measurements and includes an integer decorrelation which enables a very efficient search. A disadvantage of the integer least squares estimation is the lack of an analytical expression for the success rate. It can only be approximated by extensive Monte Carlo simulations. Moreover, the integer least squares estimation is only optimal in the absence of biases.

The success rate of ambiguity fixing depends substantially on residual biases. It is known that these biases degrade the success rate significant although a quantitative analysis has not been made so far. Moreover, the widely used sequential fixing (bootstrapping) uses a fixing order that maximizes the reliability of the first fix (i.e. smallest variance in the float solution). After this first fix, the float solution is updated and the most reliable ambiguity is selected among the remaining ones. This procedure is repeated until a predefined threshold on the probability of wrong fixing is hit or all ambiguities are fixed. The disadvantage of this method is that maximizing the reliability of the first fixes does not maximize the number of reliably fixable ambiguities. Also the other methods, e.g.

synchronous rounding, integer least squares estimation or integer aperture estimation, can be implemented efficiently but suffer from a large computational burden for the evaluation of the success rate. It is determined by a large number of Monte Carlo simulations to achieve reliable estimates of the probability of wrong fixing which is in the order of $10^{-9}$.

SUMMARY OF THE INVENTION

Proceeding from this related art, the present invention seeks to provide an improved method for errors and to provide a user system implementing the method.

This object is achieved by a method having the features of the independent claim. Advantageous embodiments and refinements are specified in claims dependent thereon.

In the method, the number of resolvable phase ambiguities is maximized by the selection of the sequence for a predefined requirement on the probability of wrong resolution of phase ambiguities and a predefined upper bound on the measurement biases. Thus, the number of satellites, whose ambiguities can be fixed, is maximized, so that the phase measurements of a large number of satellites can be used for determining the position of the user system. In some cases the number of satellites, whose ambiguity can be resolved is even sufficiently large enough for performing an integrity check. It should be noted that the method tries to maximize the number of resolvable satellites, whereas prior art methods try to find the satellites, whose ambiguities can be estimated with maximum reliability. The prior art approach, however, generally results in a lower number of resolvable satellites in comparison with the method, in which the number of resolvable phase ambiguities is maximized.

In one embodiment, the resolution of the phase ambiguities depends on information on instrumental code and phase biases that result from the delay within the satellites and possibly within the user system. These instrumental biases have been determined previously by:
  measuring phase and code signal by a plurality of reference stations;
  performing a least-square-estimation of linear independent ranges, ionospheric errors, ambiguities, receiver biases and satellite biases for at least two epochs;
  performing a real valued ambiguity estimation by using a Kalman filter initialized by the previously estimation of the ranges, ionospheric errors, ambiguities and receiver biases and satellites biases and further initialized by range rates, that has been calculated from a difference of the estimated ranges of different epochs;
  sequential determination of the integer valued ambiguities based on the previously estimated real valued ambiguities once the probability of wrong fixing drops below a predefined threshold;
  performing an estimation of receiver biases and satellite biases for both code and phase measurements by using a Kalman filter initialized by previously estimated linear independent ranges, range rates, ionospheric errors and receiver biases and satellite biases and predefined values for the unresolved linear dependent receiver and satellite biases. The instrumental biases are usually stored in a database and can be retrieved by the user system. By such an embodiment, the instrumental biases of code and phase measurements can be determined and further be used for improving the estimation of ambiguities and ionospheric error.
  For determining the code and phase biases a least-square estimation must be performed on a number of linear independent variables such as ranges, ionospheric errors, ambiguities, receiver biases and satellite biases for at least two epochs. If the code and phase measurements are from a number R of receivers, a number K of satellites and a number M of frequencies, MR receiver biases, M(K−1) satellite biases and MKR−MR−M(K−1) ambiguities are linear independent.

After the instrumental biases have been retrieved from a database, the integer ambiguities of the user system are determined based on previously determined biases. Thus, the ambiguities can be fixed with a higher reliability.

In one embodiment, the selection of the sequence is performed by:
  using a search tree for determining the fixing sequence, the search tree comprising a plurality of branches representing various sequences of satellites that are arranged along branches of the search tree,
  determining the length of the branch by determining the probability of wrong fixing for each node of the search tree, wherein the search along the branch of the search tree is terminated if the probability of wrong fixing exceeds a preset limit and wherein the length of a particular branch depends on the number of nodes passed until the search along a branch is terminated, and by
  selecting the sequence associated with the branch having the greatest length.

By using a search tree for examining the fixing sequence of the satellites a systematic search can be performed on all possible permutations of the satellites. By terminating the searches along the branches if the probability of wrong fixing exceeds preset limits, the search is significantly reduced resulting in less time that is needed for performing the search.

The search is generally performed by assuming a unidirectional accumulation of environmental biases from the selected satellites. The environmental biases are due to the troposphere and due to reflections in the vicinity of the navigation device. Generally, an elevation dependent exponential profile of the environmental bias magnitudes is used. By accumulating the environmental biases from the selected satellites, a worst case scenario is considered. Thus, the method can also be performed under adverse conditions. The use of elevation dependent exponential profiles takes into account that the error associated with satellites with no elevation are higher than the error associated with satellites at higher elevation.

The search for a suitable sequence of satellite can be performed without, with partial or full integer decorrelation of the float ambiguities depending on the requirements on precision.

The satellites can also be selected by requiring an azimuthal separation between the satellites of subsequent resolutions of the phase ambiguities. This requirement reflects the fact the ambiguities can be better fixed if the azimuthal separation is higher.

This requirement can be mitigated depending on the number of checked nodes so that suitable satellites can still be found even if the number of satellites decreases, while the search is progressing.

In one further embodiment, the received carrier signals and further received code signals are combined into a multi-frequency, geometry preserving, ionosphere-free, integer preserving code-carrier combination and a multi-frequency, geometry-preserving, ionosphere-free, code-only combination for the sequential resolving of the phase ambiguities. By using such a combination the ambiguities can be effectively reduced.

The multi-frequency code-carrier combination and the code-only combination are generally smoothed by a multi-frequency carrier-only combination resulting in a smoothed code-carrier multi-frequency combination and code-only combination for the sequential resolving of the phase ambiguities. By using the smoothed code-carrier combination the multi-path and code noise can be effectively suppressed.

For maximizing the ambiguity discrimination, the weighting coefficients of the geometry-preserving, ionosphere-free, integer preserving code-carrier combination are selected maximizing the ratio of the wavelength and the standard deviation of the smoothed code-carrier combination for the sequential resolving of the phase ambiguities.

The resolved ambiguities can also be validated using ambiguities obtained from a geometry-free, ionosphere-free carrier smoothed multi-frequency code-carrier combination.

For further determining the ionospheric error, the resolved phase ambiguities are subtracted from a geometry-free, ionosphere preserving, integer preserving, mixed code-carrier combination of multi-frequency code and carrier signals that comprises the same ambiguity combination as the geometry preserving, ionosphere-free, integer preserving code-carrier combination.

The multi-frequency geometry-free, ionosphere preserving, integer preserving, mixed code-carrier combination is smoothed by a multi-frequency carrier-only combination resulting in a smoothed code-carrier multi-frequency combination. Thus the code noise and the multi-path noise can be reduced.

The weighting coefficients of the geometry-free ionosphere preserving, integer preserving code-carrier combination are selected maximizing the ratio of the wavelength and the standard deviation of the smoothed code-carrier combination that comprises the same ambiguity combination as the geometry preserving, ionosphere-free, integer preserving code-carrier combination. By such an approach the determination of the ionospheric error and of the ambiguities can be optimized in common.

BRIEF DESCRIPTION OF THE DRAWINGS

Further advantages and properties of the present invention are disclosed in the following description, in which exemplary embodiments of the present invention are explained in detail based on the drawings:

FIGS. 12 and 13 are shown;

DETAILED DESCRIPTION OF THE INVENTION

Figure 1:
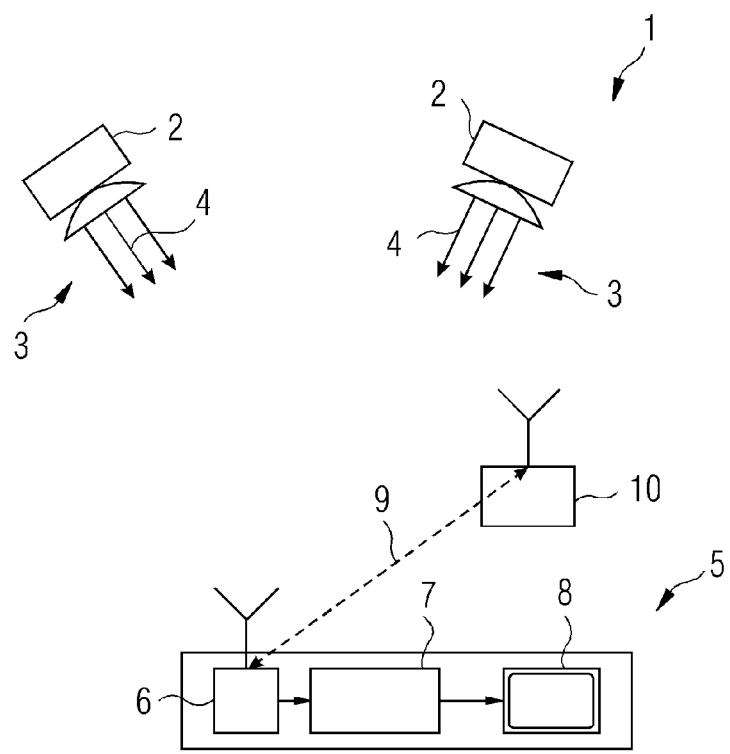
FIG. 1 depicts a navigation device for a global navigation satellite system.

FIG. 1 shows a global navigation satellite system 1 which comprises satellites 2 orbiting around the earth and emitting navigation signals 3 modulated on a number of carrier signals 4.

A user system or navigation device 5 comprises a receiver 6 which is connected to a signal processor 7. The signal processor 7 processes the navigation signal 3 received from the satellites 2 and displays the results on a display 8 of the navigation device 5.

For determining the position of the navigation device 5 various methods can be used. In the double difference method the length d of a baseline vector 9 between the navigation device 5 and a reference station 10 is determined.

For determining the position of the navigation system 5 the phases of the carrier signals 4 can be determined. However, these phase signals are affected by ambiguities that must be resolved. Generally, these ambiguities are resolved by linear combination of the carrier signals 4. This combination considerably simplifies the phase integer ambiguity resolution due to the large combined wavelength. However, the carrier signals 4 can also be affected by ionospheric delay that is caused by the ionospheric dispersion.

Figure 2:
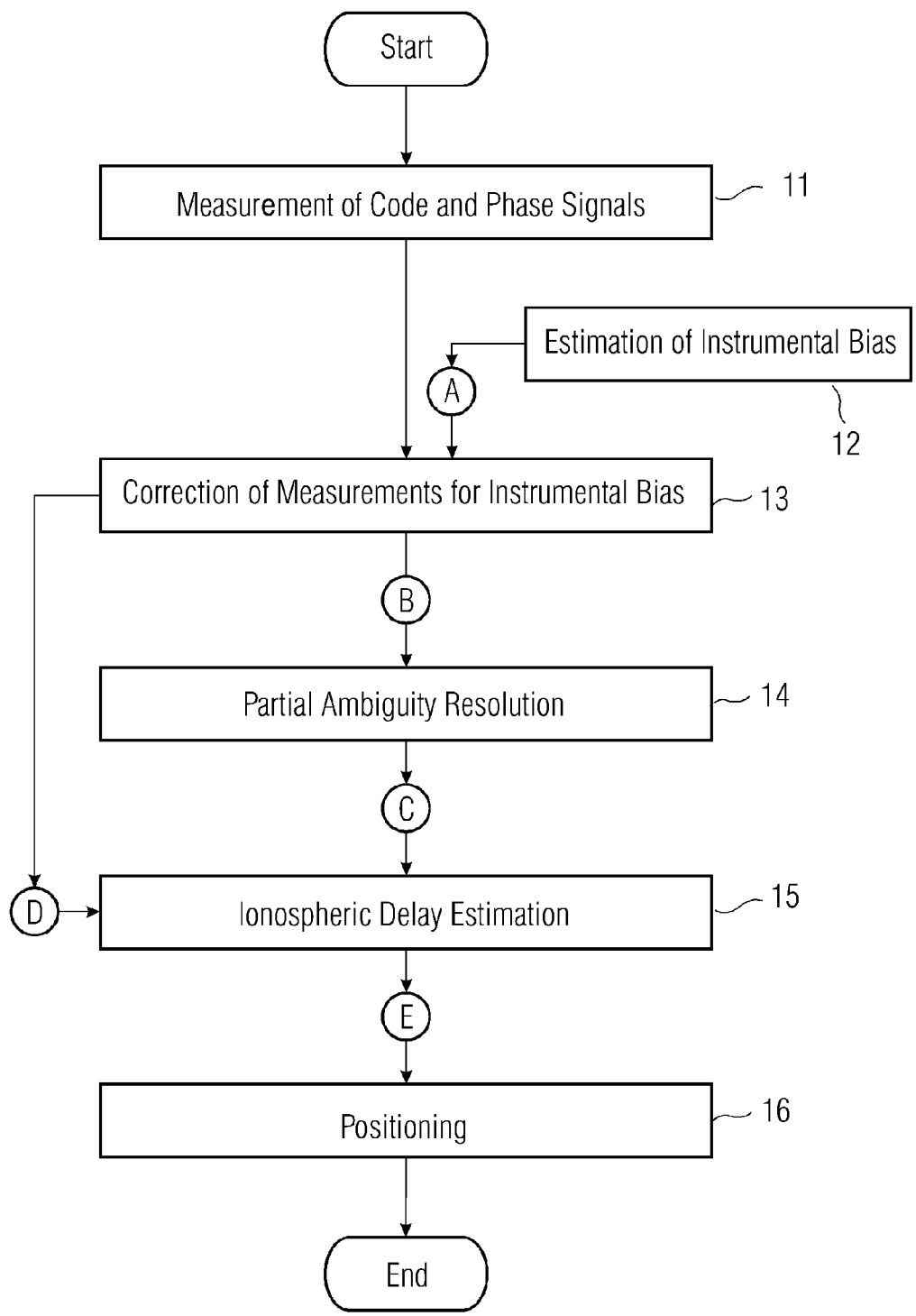
FIG. 2 shows an overview on a process for ionospheric delay estimation.

FIG. 2 gives an overview over a method for estimating the ionospheric delay. The method starts with a measurement 11 of code and phase signals. The navigation device 5 then retrieves instrumental biases of the satellites 2 and possibly also instrumental biases of the navigation device 5 from a database that is accessible to the navigation device 5. These biases have been determined previously by an estimation 12 using a network of the reference stations 10. The instrumental biases provided by the previous estimation 12 are used for a correction 13 of the measured code and phase signals. After the correction 13 of the measurement, a partial ambiguity resolution 14 is performed followed by an ionospheric delay estimation 15. After the ionospheric error has been estimated, a positioning 16 takes place. For positioning 16, information on the ionospheric error and the ambiguities determined previously can be used.

Figure 3:
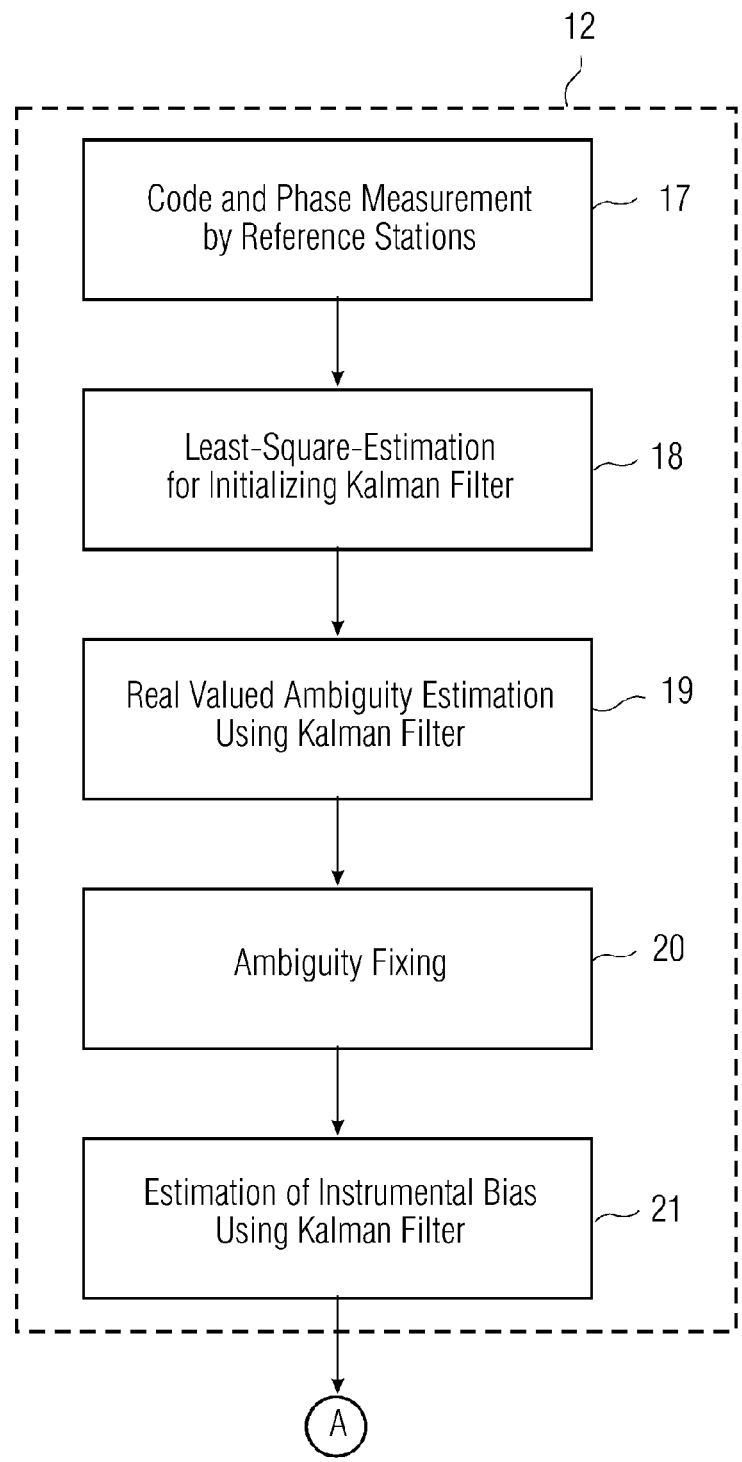
FIG. 3 shows a flow diagram of a bias estimation.

FIG. 3 shows a flow diagram of the biases estimation 12 that has been performed using a network of reference stations 10. The biases estimation 12 starts with code and phase measurements 17 of reference stations 10. In a next step, a least-square estimation 18 of linear independent variables, such as ranges, ionospheric errors, receiver biases and satellite biases is performed for at least two epochs. The results of the least-square estimation 18 are used for a real valued ambiguity estimation 19 that uses a Kalman filter for a sequential estimation of the real valued ambiguities.

It should be noted that the ambiguity estimation 12 involves an implicit mapping of satellite phase and code biases and receiver phase and code biases since only the linear independent variables can be determined.

Once the probability of wrong fixing drops below a predefined threshold, an ambiguity fixing 20 is executed. Using the fixed ambiguities, an estimation 21 of the instrumental biases takes place. These biases can then be stored in a database that is accessible to the navigation device 5.

Once the instrumental biases are known with sufficient accuracy, the instrumental biases can be used for the correction 13 of the measured code and phase signals.

During the estimation 21 of the instrumental biases, the separation of satellite and receiver biases of both phase and code measurements on each frequency is performed with a Kalman filter to overcome the rank deficiency that is inherent with the estimation of all biases.

Figure 4:
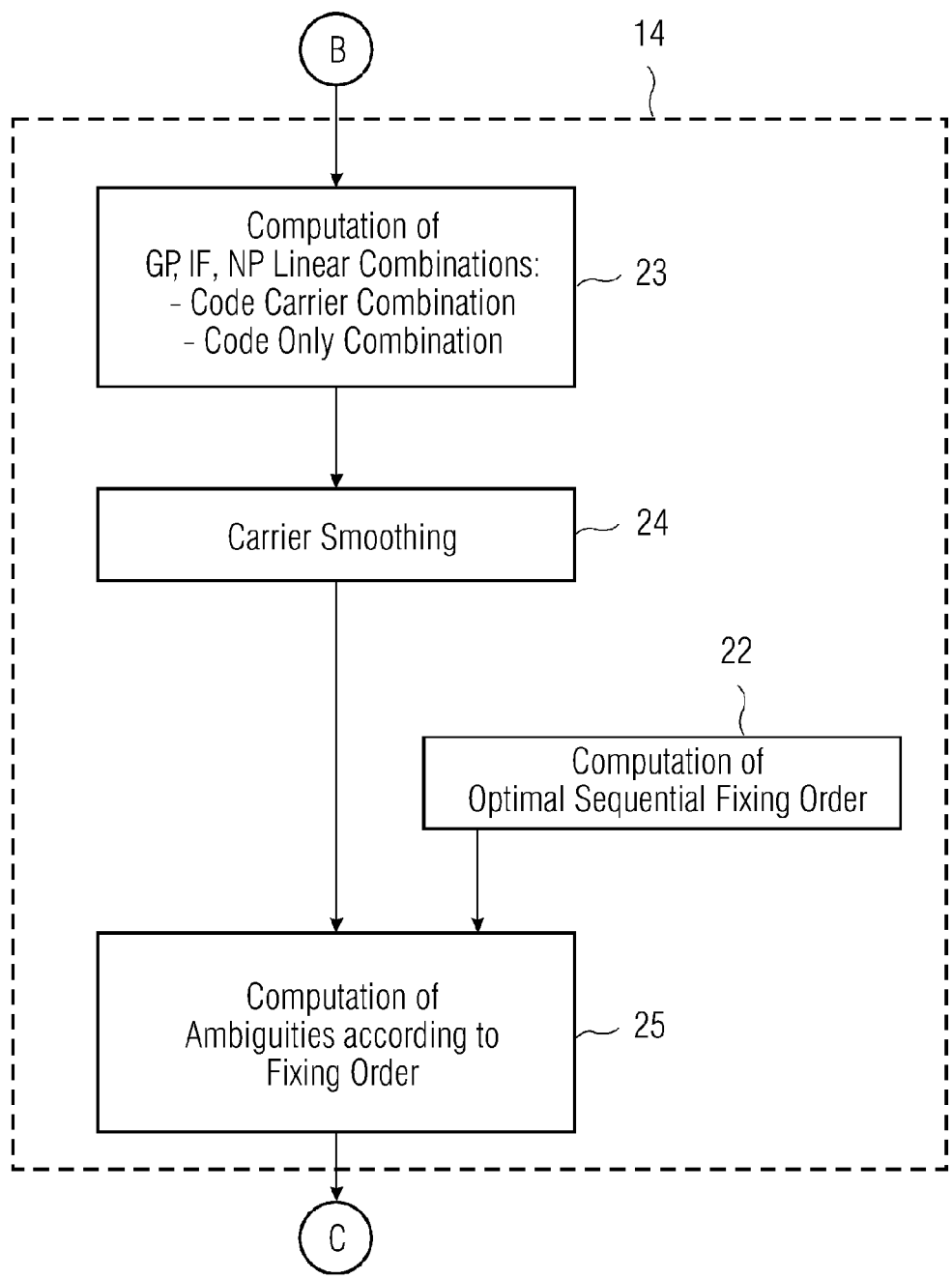
FIG. 4 shows a flow diagram of a partial ambiguity resolution.

The partial ambiguity resolution 14 can then be performed in a subsequent step. The partial ambiguity resolution 14 is shown in detail in FIG. 4. The partial ambiguity resolution 14 is performed sequentially in an optimized order which is determined by a method that maximizes the number of reliably fixable ambiguities in contrast to current techniques that maximize the reliability of the first fix. The maximization of the number of fixable ambiguities is performed for a worst-case scenario, i.e. the positive accumulation of all measurement biases in the conditional ambiguity estimates. The optimal order is determined by a recursive tree search method that takes a bound on residual, uncorrected measurements biases (e.g. elevation dependent exponential) into account. In FIG. 4 the optimum order is determined by a computation 22 of the optimal sequential fixing order. The partial ambiguity resolution 14 further comprises a computation 23 of geometry-preserving (GP), ionosphere-free (IF) and integer preserving (NP) linear combinations, in particular a code-carrier combination and a code only combination. After the combinations have been computed, a carrier smoothing 24 is performed. The smoothed linear combinations and the fixing order are used for a computation 24 of ambiguities according to the fixing order. Thus, the ambiguity resolution 14 uses two carrier smoothed linear combinations that are geometry-preserving, ionosphere-free and integer preserving. The first combination might be a smoothed code-carrier combination of maximum discrimination and the second combination might be a smoothed code-only combination. The optimization of the weighting coefficients also includes the smoothing period.

Figure 5:
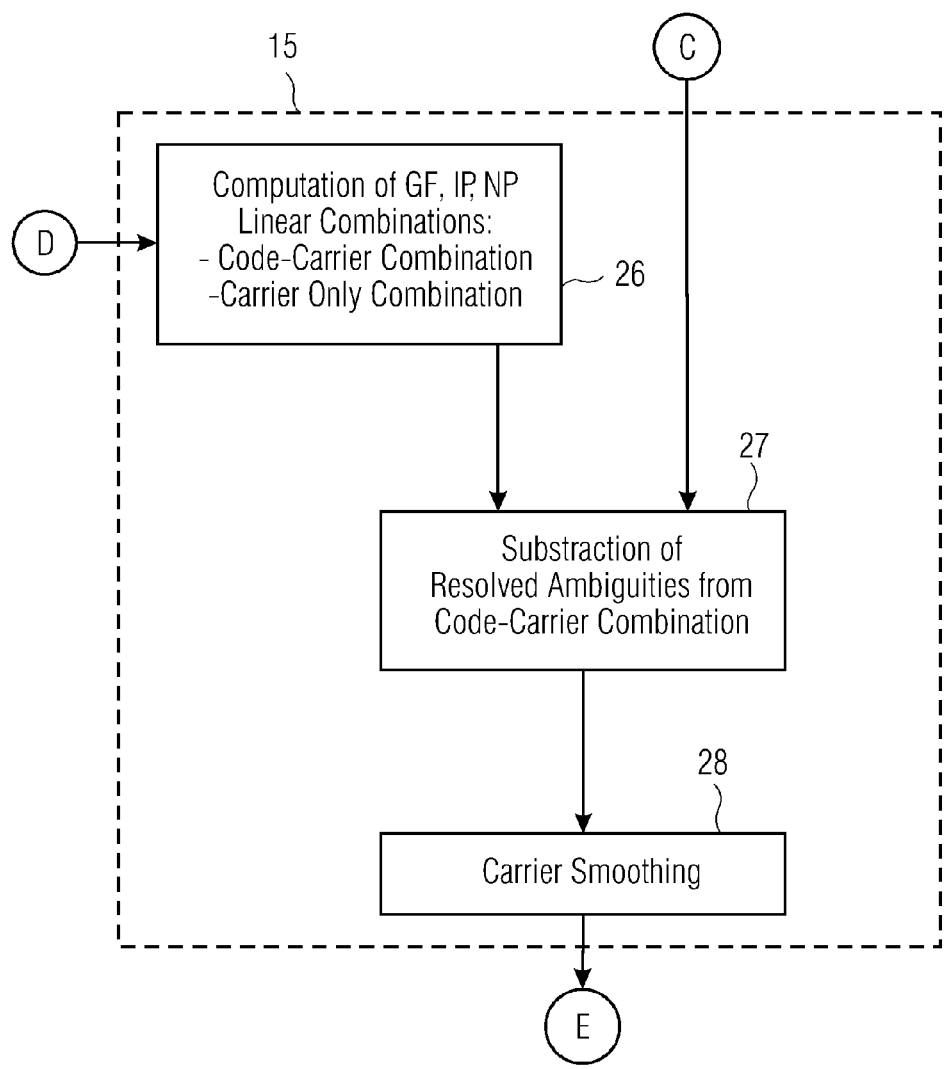
FIG. 5 shows a flow diagram of an ionospheric delay estimation.

FIG. 5 shows details of the ionospheric delay estimation 15 depicted in FIG. 2. For the ionospheric delay estimation two new linear combinations are used.

These combinations must be geometry-free (GF), ionosphere-preserving (IP) and integer preserving (NP). One of them is again a code-carrier combination which shows the same integer combination as the geometry-preserving, ionosphere-free one of the partial ambiguity resolution 14. The other combination is a code-only combination. The linear combinations are determined by a computation 26. The computation 26 is followed by a subtraction 27 of the resolved ambiguities from the code carrier combination so that the only remaining error is the ionospheric error and the noise. The noise can be further reduced by carrier smoothing 28.

The weighting coefficient for the computation 26 that determines the linear combinations are determined together with the coefficients of the smoothing combination. Thus, the optimal weighting coefficients depend also on the smoothing period.

A. Estimation of Phase and Code Biases

Ambiguity resolution for precise ionospheric delay estimation requires the estimation of phase and code biases by a network of reference stations 10. The following model is used for undifferenced phase and code measurements of satellite k, receiver r and epoch $t_n$:

$$\phi_{1,r}^k(t_n) = g_r^k(t_n) - I_{1,r}^k(t_n) + \lambda_1 N_{1,r}^k + \beta_{1,r} + \beta_1^k + \epsilon_{1,r}(t_n)$$

$$\phi_{2,r}^k(t_n) = g_r^k(t_n) - q_{12}^2 I_{1,r}^k(t_n) + \lambda_2 N_{2,r}^k + \beta_{2,r} + \beta_2^k + \epsilon_{2,r}(t_n)$$

$$\rho_{1,r}^k(t_n) = g_r^k(t_n) + I_{1,r}^k(t_n) + b_{1,r} + b_1^k + \eta_{1,r}(t_n)$$

$$\rho_{2,r}^k(t_n) = g_r^k(t_n) + q_{12}^2 I_{1,r}^k(t_n) + b_{2,r} + b_2^k + \eta_{2,r}(t_n) \quad (1)$$

where $g_r$ denotes the range including clock errors and tropospheric delay, $\beta_{m,r}$ is the receiver phase bias, $\beta_m^k$ is the satellite phase bias, $b_{m,r}$ is the receiver code bias and $b_m^k$ is the satellite code bias on frequency m={1,2}.

A least-square estimation of $g_r^k(t_n)$, $I_{1,r}^k(t_n)$, $N_{1,r}^k$, $N_{2,r}^k$, $\beta_{m,r}$, $\beta_m^k$, $b_{m,r}$, and $b_m^k$ is infeasible even for an arbitrary large number of epochs as the coefficient matrix becomes rank deficient. Consider a case, where R is the number of receivers, K is the number of satellites, M the number of frequencies and T the number of epochs. If there are 2 frequencies, 10 satellites and 20 receiver as well as 50 epochs, this would result in 10,000 variables. A least-square estimation with 10,000 variables can hardly be computed even if nowadays computers are used. Therefore, only linear independent variables are determined by the least-square estimation 18. A set of linear independent variables can be obtained by a mapping of all variables onto a set of linear independent variables.

Thus, the rank deficiency is removed from equation (1) by a set of transformations. In these transformations, receiver dependent variables are mapped into receiver dependent variables and satellite dependent variables are mapped into satellite dependent variables. First, $b_{1,r}$ is mapped to the range/clock offset $g_r^k$:

$$g_r^{k,I} = g_r^k + b_{1,r}$$

$$I_r^{k,I} = I_r^k$$

$$\beta_{1,r}^I = \beta_{1,r} - b_{1,r}$$

$$\beta_{2,r}^I = \beta_{2,r} - b_{1,r}$$

$$b_{2,r}^I = b_{2,r} - b_{1,r}$$

$$\beta_1^{k,I} = \beta_1^k$$

$$\beta_2^{k,I} = \beta_2^k$$

$$b_1^{k,I} = b_1^k$$

$$b_2^{k,I} = b_2^k \quad (2)$$

Secondly, the receiver code biases $b_{2,r}$ are absorbed in the range, ionospheric delay and phase biases, i.e.

$$g_r^{k,II} = g_r^{k,I} + 1/(1 - q_{12}^2) \cdot b_{2,r}^I$$

$$I_r^{k,II} = I_r^{k,I} - 1/(1 - q_{12}^2) \cdot b_{2,r}^I$$

$$\beta_{1,r}^{II} = \beta_{1,r}^I - 2/(1 - q_{12}^2) \cdot b_{2,r}^I$$

$$\beta_{2,r}^{II} = \beta_{2,r}^I - (1 + q_{12}^2)/(1 - q_{12}^2) \cdot b_{2,r}^I$$

$\beta_1^{k,II}=\beta_1^{k,I}$ $\beta_2^{k,II}=\beta_2^{k,I}$ $b_1^{k,II}=b_1^{k,I}$ $b_2^{k,II}=b_2^{k,I}$ (3)

The third transformation is similar to (2) and maps the transformed satellite code bias $b_1^{k,II}$ to the range, i.e.

$g_r^{k,III}=g_r^{k,II}+b_1^{k,II}$ $I_r^{k,III}=I_r^{k,II}$ $\beta_{1,r}^{III}=\beta_{1,r}^{II}$ $\beta_{2,r}^{III}=\beta_{2,r}^{II}$ $\beta_1^{k,III}=\beta_1^{k,II}-b_1^{k,II}$ $\beta_2^{k,III}=\beta_2^{k,II}-b_1^{k,II}$ $b_2^{k,III}=b_2^{k,II}-b_1^{k,II}$ (4)

The satellite code biases on the second frequency cannot be separated from the remaining parameters which leads to the transformation $g_r^{k,IV}=g_r^{k,III}+1/(1-q_{12}^2)\cdot b_2^{k,III}$ $I_r^{k,IV}=I_r^{k,III}-1/(1-q_{12}^2)\cdot b_2^{k,III}$ $\beta_{1,r}^{IV}=\beta_{1,r}^{III}$ $\beta_{2,r}^{IV}=\beta_{2,r}^{III}$ $\beta_1^{k,IV}=\beta_1^{k,III}-2/(1-q_{12}^2)\cdot b_2^{k,III}$ $\beta_2^{k,IV}=\beta_2^{k,III}-(1-q_{12}^2)/(1-q_{12}^2)\cdot b_2^{k,III}$ (5)

Finally, the phase biases of the first satellite 2 are absorbed in the transformed receiver and satellite biases, i.e.

$g_r^{k,V}=g_r^{k,IV}$ $I_r^{k,V}=I_r^{k,IV}$ $\beta_{1,r}^{V}=\beta_{1,r}^{IV}+\beta_1^{1,IV}$ $\beta_{2,r}^{V}=\beta_{2,r}^{IV}+\beta_2^{1,IV}$ $\beta_1^{k,V}=\beta_1^{k,IV}-\beta_1^{1,IV}$ $\beta_2^{k,V}=\beta_2^{k,IV}-\beta_2^{1,IV}$ (6)

Thus, (1) can be rewritten as $\varphi_{1,r}^k(t_n)=g_r^{k,V}(t_n)-I_{1,r}^{k,V}(t_n)+\lambda_1 N_{1,r}^k+\beta_{1,r}^V+\beta_1^{k,V}+\varepsilon_{1,r}(t_n)$ $\varphi_{2,r}^k(t_n)=g_r^{k,V}(t_n)-q_{12}^2 I_{1,r}^{k,V}(t_n)+\lambda_2 N_{2,r}^k+\beta_{2,r}^V+\beta_2^{k,V}+\varepsilon_{1,r}(t_n)$ $\rho_{1,r}^k(t_n)=g_r^{k,V}(t_n)+I_{1,r}^{k,V}(t_n)+\eta_{1,r}(t_n)$ $\rho_{2,r}^k(t_n)=g_r^{k,V}(t_n)+q_{12}^2 I_{1,r}^{k,V}(t_n)+\eta_{2,r}(t_n)$ (7)

with $g_r^{k,V}(t_n) =$ (8)

$g_r^k(t_n) + b_{1,r} + \frac{1}{1-q_{12}^2}\cdot(b_{2,r}-b_{1,r})+b_1^k+\frac{1}{1-q_{12}^2}\cdot(b_2^k-b_1^k)$ $I_{1,r}^{k,V}(t_n) = I_{1,r}^k(t_n) - \frac{1}{1-q_{12}^2}\cdot(b_{2,r}-b_{1,r}) - \frac{1}{1-q_{12}^2}\cdot(b_2^k-b_1^k)$ $\beta_{1,r}^V =$ $\beta_{1,r}-b_{1,r}-\frac{2}{1-q_{12}^2}\cdot(b_{2,r}-b_{1,r})-\left(\beta_1^1-b_1^1-\frac{2}{1-q_{12}^2}\cdot(b_2^1-b_1^1)\right)$ $\beta_{2,r}^V = \beta_{2,r}-b_{1,r}-\frac{1+q_{12}^2}{1-q_{12}^2}\cdot(b_{2,r}-b_{1,r}) -$ $\left(\beta_2^1-b_1^1-\frac{1+q_{12}^2}{1-q_{12}^2}\cdot(b_2^1-b_1^1)\right)$ $\beta_1^{k,V} = \begin{cases} 0 & \text{if } k=1 \\ \beta_1^k-b_1^k-\frac{2}{1-q_{12}^2}\cdot(b_2^k-b_1^k) & \text{else.} \end{cases}$ $\beta_2^{k,V} = \begin{cases} 0 & \text{if } k=1 \\ \beta_2^k-b_1^k-\frac{1+q_{12}^2}{1-q_{12}^2}\cdot(b_2^k-b_1^k) & \text{else.} \end{cases}$ The system of equations in (7) is still rank deficient as biases and ambiguities can not be separated. There exist three approaches to overcome the remaining rank deficiency of degree $2R+2(K-1)$: The first one is to map all biases to ambiguities which results in a poor performance as the integer property of the ambiguities is lost. The second approach is an inverse mapping, i.e. $2R+2(K-1)$ ambiguities are mapped to biases and the remaining ambiguities are kept. The third approach uses a search to separate the ambiguities from the biases.

The inverse mapping absorbs the ambiguities $N_{1,1}^1$ and $N_{2,1}^1$ in the receiver phase biases $\beta_{1,1}^V$ and $\beta_{2,1}^V$, i.e.

$\beta_{1,1}^{(1)}=\beta_{1,1}^V+\lambda_1 N_{1,1}^1$ $\beta_{2,1}^{(1)}=\beta_{2,1}^V+\lambda_2 N_{2,1}^1$ $N_{1,1}^{k,(1)}=N_{1,1}^k-N_{1,1}^1$ $N_{2,1}^{k,(1)}=N_{1,1}^k-N_{2,1}^1$ (9)

Moreover, the remaining $2(K-1)$ ambiguities of the first receiver are mapped to the satellite phase biases, i.e.

$\beta_1^{k,(2)}=\beta_1^{k,V}+\lambda_1 N_{1,1}^{k,(1)}$ $\beta_2^{k,(2)}=\beta_2^{k,V}+\lambda_2 N_{2,1}^{k,(1)}$ $N_{1,r}^{k,(2)}=N_{1,r}^k-N_{1,1}^{k,(1)}\forall r\in\{2,\ldots,R\}$ $N_{2,r}^{k,(2)}=N_{2,r}^k-N_{2,1}^{k,(1)}\forall r\in\{2,\ldots,R\}$ (10)

For all other receivers, the ambiguities $N_{1,r}^1$ and $N_{2,r}^1$ of the first satellite can be included in the receiver biases, i.e.

$\beta_{1,r}^{(3)}=\beta_{1,r}^V+\lambda_1 N_{1,r}^1$ $\beta_{2,r}^{(3)}=\beta_{2,r}^V+\lambda_2 N_{2,r}^1$ $N_{1,r}^{k,(3)}=N_{1,r}^k-N_{1,r}^1\forall k\in\{2,\ldots,K\}$ $N_{2,r}^{k,(3)}=N_{2,r}^k-N_{2,r}^1\forall k\in\{2,\ldots,K\}$ (11)

The mappings of ambiguities to biases in (9)-(11) can be combined to $\beta_{1,r}^{(3)}=\beta_{1,r}^V+\lambda_1 N_{1,r}^1 \forall r$ (12)

-continued $$\beta_1^{k,(3)} = \begin{cases} 0 & \text{if } k = 1 \\ \beta_1^{k,V} + \lambda_1 N_{1,1}^k - \lambda_1 N_{1,1}^1 & \forall k > 1 \end{cases}$$

$$N_{1,r}^{k,(3)} = \begin{cases} 0 & \text{if } r = 1 \lor k = 1 \\ N_{1,r}^k - N_{1,1}^k + N_{1,1}^1 - N_{1,r}^1 & \forall r > 1 \land k > 1. \end{cases}$$

The 8 transformations in (2)-(6) and (9)-(11) result in a full rank system of equations which can be written in matrix-vector-notation as $$z = H \begin{bmatrix} g \\ I \\ \beta_R \\ \beta^S \end{bmatrix} + AN + \eta, \tag{13}$$

where sorting of measurements is given by $$z = [\phi_{1,1}^1(t_1), \ldots, \phi_{1,1}^K(t_1), \ldots, \phi_{1,R}^K(t_1), \ldots, \phi_{2,R}^K(t_N), \rho_{1,1}^1(t_1), \ldots, \rho_{2,R}^K(t_T)]^T$$

$$g = [g_1^1(t_1), \ldots, g_1^K(t_1), \ldots, g_R^K(t_1), \ldots, g_R^K(t_T)]^T,$$

$$I = [I_1^1(t_1), \ldots, I_1^K(t_1), \ldots, I_R^K(t_1), \ldots, I_R^K(t_T)]^T,$$

$$\beta_R = [\beta_{1,1}, \ldots, \beta_{1,R}, \beta_{2,1}, \ldots, \beta_{2,R}]^T,$$

$$\beta_S = [\beta_1^2, \ldots, \beta_1^K, \beta_2^2 \ldots, \beta_2^K]^T,$$

$$N = [N_{1,2}^2, \ldots, N_{1,2}^K, \ldots, N_{1,R}^K, N_{2,2}^2, \ldots, N_{2,2}^K, \ldots, N_{2,R}^K]^T \tag{14}$$

and the coefficient matrix $$H = [1^{T \times T} \hat{x} H_g, 1^{T \times T} \hat{x} H_I, 1^{T \times 1} \hat{x} H_{bR}, 1^{T \times 1} \hat{x} H_{bS},] \tag{15}$$

with the single epoch range mapping matrix $$H_g = [1^{4 \times 1} \hat{x} 1^{KR \times KR}] \tag{16}$$

the single epoch ionospheric mapping matrix $$H_I = [q_{11}^2, q_{12}^2, -q_{11}^2, -q_{12}^2]^T \hat{x} 1^{KR \times KR} \tag{17}$$

the single epoch receiver bias mapping matrix $$H_{bR} = \begin{bmatrix} 1 \\ 0 \end{bmatrix} \otimes [1^{2R \times 2R} \otimes 1^{K \times 1}], \tag{18}$$

the single epoch satellite bias mapping matrix $$H_{bS} = 1^{2 \times 1} \otimes \left( 1^{2 \times 2} \otimes \left( 1^{R \times 1} \otimes \begin{bmatrix} 0^{1 \times K-1} \\ 1^{(K-1) \times (K-1)} \end{bmatrix} \right) \right). \tag{19}$$

and the single epoch integer ambiguity mapping matrix $$A = \begin{bmatrix} 1 \\ 0 \end{bmatrix} \otimes \left( \begin{bmatrix} \lambda_1 & 0 \\ 0 & \lambda_2 \end{bmatrix} \otimes \begin{bmatrix} 0^{K \times (K-1)(R-1)} \\ 1^{(R-1) \times (R-1)} \otimes \begin{bmatrix} 0^{1 \times (K-1)} \\ 1^{(K-1) \times (K-1)} \end{bmatrix} \end{bmatrix} \right). \tag{20}$$

A bias estimation with millimeter accuracy requires measurements from a few hundred epochs. As the dimension of z is 4KRT and a least-squares estimation becomes computationally infeasible already for a small network and a moderate number of epochs, the problem is solved in two steps: First, the least-squares estimation 18 is performed using a small number of epochs. The obtained estimates and their covariance matrix are then used to initialize a Kalman filter which includes the range, the range rate, the ionospheric delays, the receiver and satellite biases, and the integer ambiguities as states, i.e.

$$x_n = [g^T(t_n), \dot{g}^T(t_n), I^T(t_n), \beta_R^T, \beta_S^T, N^T]^T \tag{21}$$

The Kalman filter can be used to perform the real valued ambiguity estimation 19. Once the ambiguities have achieved a sufficient accuracy, they are fixed by ambiguity fixing 20 and removed from the state vector. By the further estimation 21, the biases can then be estimated with higher accuracy.

The measurements at epoch $t_n$ are obtained from $x_n$ as $$z_n = H_n x_n + v_n \tag{22}$$

with $$H_n = [H_g, H_{\dot{g}}, H_I, H_{bR}, H_{bS}, A] \tag{23}$$

where $H_{\dot{g}} = 0^{4KR \times KR}$. The measurement noise vector $v_n$ is assumed Gaussian distributed with zero mean and covariance $\Sigma_R$ that is given by $$\Sigma_R = \begin{bmatrix} \sigma_{\phi_1}^2 & & & \\ & \sigma_{\phi_2}^2 & & \\ & & \sigma_{\rho_1}^2 & \\ & & & \sigma_{\rho_2}^2 \end{bmatrix} \otimes 1^{KR \times KR}. \tag{24}$$

The state space model includes additional information by relating the current and previous states, i.e.

$$x_n = \Phi x_{n-1} + w_n \tag{25}$$

with the state transition matrix $$\Phi = \begin{bmatrix} 1^{KR \times KR} & \Delta t \cdot 1^{KR \times KR} & \\ & 1^{KR \times KR} & \\ & & 1^{3KR \times 3KR} \end{bmatrix} \tag{26}$$

and the zero mean process noise $w_n$. Its covariance matrix is given by Schlötzer in [5] as $$\Sigma_Q = \begin{bmatrix} \begin{bmatrix} S_p \cdot \Delta t^3/3 & S_p \cdot \Delta t^2/2 \\ S_p \cdot \Delta t^2/2 & S_p \cdot \Delta t \end{bmatrix} \otimes 1^{KR \times KR} & & \\ & \sigma_I^2 \cdot 1^{KR \times KR} & \\ & & 0^{2KR \times 2KR} \end{bmatrix}, \tag{27}$$

where $S_p$ denotes the spectral amplitude of the random walk process. A derivation of the variances and covariances of the random walk process is given by Brown and Hwang in [6], i.e.

$$E\{x(\Delta t)x(\Delta t)\} = \int_0^{\Delta t} u \cdot v \cdot S_p \cdot \delta(u-v) du dv = S_p \cdot \frac{\Delta t^3}{3} \tag{28}$$

$$E\{\dot{x}(\Delta t)\dot{x}(\Delta t)\} = \int_0^{\Delta t} 1 \cdot 1 \cdot S_p \cdot \delta(u-v) du dv = S_p \cdot \Delta t$$

$$E\{x(\Delta t)\dot{x}(\Delta t)\} = \int_0^{\Delta t} 1 \cdot v \cdot S_p \cdot \delta(u-v) du dv = S_p \cdot \frac{\Delta t^2}{2}.$$

The Kalman filter based estimation of $x_n$ includes a prediction and an update step. The current state estimate $\hat{x}_n^+$ is extrapolated with the state space model, i.e.

$$\hat{x}_{n+1}^- = \Phi \hat{c}_n^+ \tag{29}$$

The covariance matrix of the predicted (a priori) state estimate follows as $$P_{n+1}^- = \Phi P_n^+ \Phi^T + \Sigma_Q \tag{30}$$

The predicted state is updated once the measurements of the next epoch are available, i.e. the a posteriori state estimate is given by $$\hat{x}_n^+ = \hat{x}_n^- + K_n(z_n - H_n \hat{x}_n^-) \tag{31}$$

where $z_n - H_n \hat{x}_n^-$ denotes the innovation or measurement residual and $K_n$ is the Kalman gain. It is chosen such that $$\min_{K_n} E\{P\hat{x}_n^+ - x_n P^2\} = \min_{K_n} tr(P_n^+), \tag{32}$$

where $P_n^+$ denotes the a posteriori state covariance matrix that is obtained from (31):

$$P_n^+ = P_n^- - P_n^- H_n^T K_n^T - K_n H_n P_n^- + K_n (H_n P_n^- H_n^T + \Sigma_R) K_n^T \tag{33}$$

Setting the matrix derivation $\partial tr(P_n^+)/\partial K_n = 0$ and solving for $K_n$ yields the optimal Kalman gain $$K_n = P_n^- H_n^T (H_n P_n^- H_n^T + \Sigma_R)^{-1} \tag{34}$$

which is used in (31) to obtain an a posteriori Minimum Mean Square Error (=MMSE) estimator. Equation (33) can be simplified by replacing the Kalman gain by (34), i.e.

$$P_n^+ = (1 - K_n H_n) P_n^- \tag{35}$$

The actual order of the prediction and update states is vice versa, i.e. the initial least-squares estimates $\hat{x}_1^-$ and $P_1^-$ are first corrected by the update step (31) which is then followed by the prediction step (29). Note that the initial covariance matrix $P_1^-$ includes non-zero entries for the bias and ambiguity states and, thus, differs from the process noise covariance $\Sigma_Q$ which has zero entries for both biases and ambiguities as they are constant over time.

Figure 6:
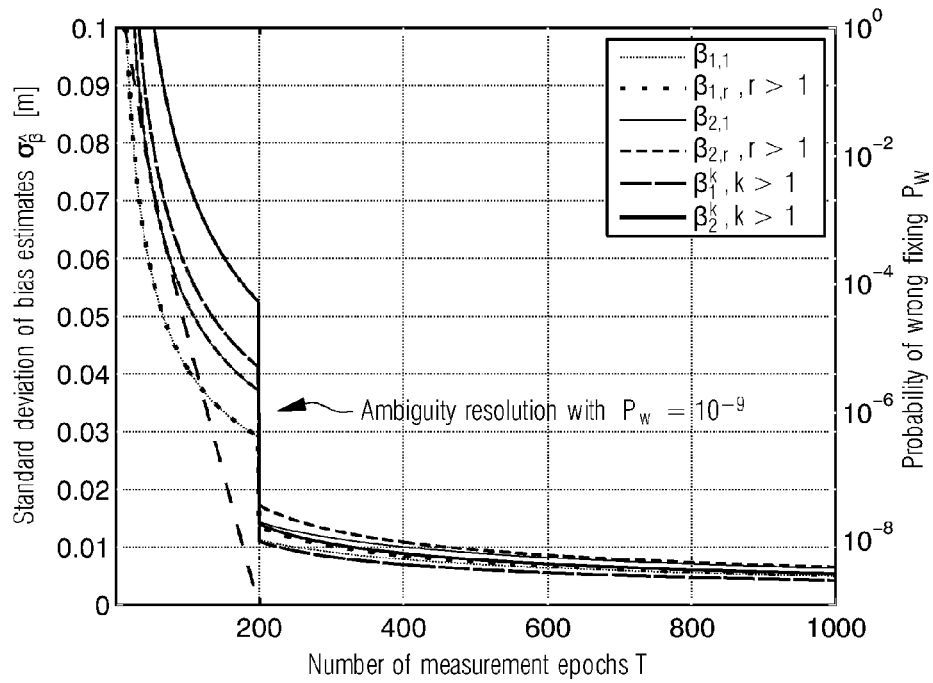
FIG. 6 shows the temporal evolution of the probability of wrong fixing and the standard deviations of the receiver and satellite bias estimates for K=10 and R=20.

FIG. 6 shows the temporal evolution of the probability of wrong fixing for various receiver biases $\beta_{m,r}$ and satellite biases $\beta_m^k$ and the standard deviations of the receiver and satellite bias estimates for K=10 and R=20. The bias estimation was performed in two steps. In a first step a least-squares estimation of an initial state vector based on two epochs was performed and in a second step a Kalman filter was used to improve the accuracy efficiently. The float ambiguity estimates of the Kalman filter converged within 200 epochs sufficiently to enable a probability of wrong fixing of $10^{-9}$. The fixing was performed sequentially with integer decorrelation and reduced the bias uncertainty by a factor between 2 and 4 depending on the satellite, receiver and frequency. The fixing results in an immediate improvement of the bias estimates as can be recognized by the jump of the probability of wrong fixing at 200 epochs. The process noise was characterized by $S_p=1$ m and $\sigma_f=1$ cm, i.e. there is no process noise for biases. A 5 mm standard deviation was achieved after 1000 epochs, i.e. less than 2 minutes for a 10 Hz receiver.

Figure 7:
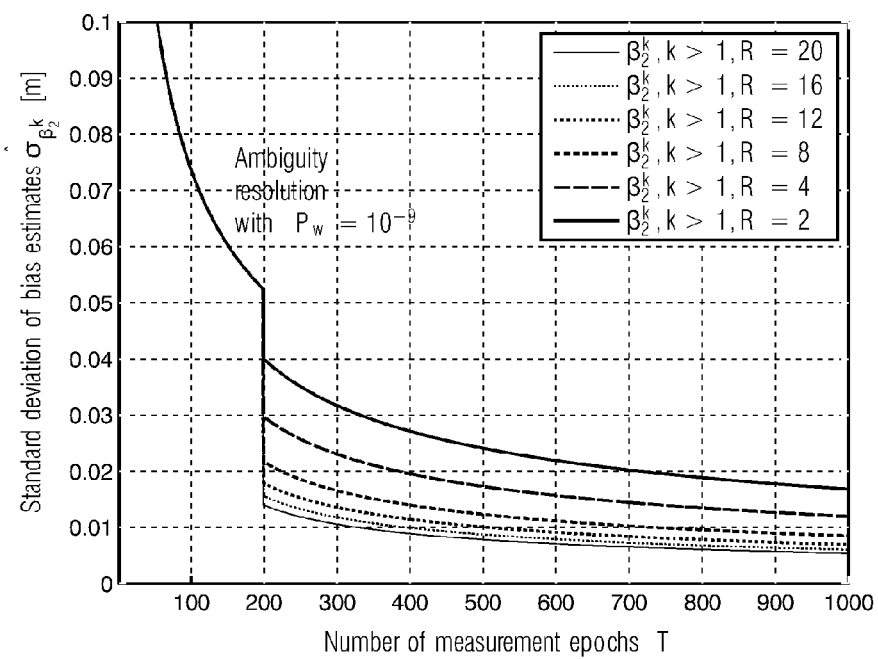
FIG. 7 demonstrates the benefit of a large network of reference stations for bias estimation.

FIG. 7 demonstrates the benefit of large network of reference stations 10 for bias estimation: The fixing of ambiguities (K=10) improves the satellite bias accuracy by a factor 4 for R=20. As in FIG. 6, the bias estimation was performed in two steps: A least-squares estimation from two epochs and a Kalman filter to improve the accuracy efficiently. The float ambiguity estimates was fixed sequentially after integer decorrelation. The process noise is characterized by $S_p=1$ m and $\sigma_f=1$ cm.

As can be recognized form FIG. 7, the network size R considerably affects the achievable bias accuracies. As long as no ambiguities are fixed, the bias estimation does not benefit from a large R as the number of ambiguities plus biases increases with KR. However, the gain in the bias estimation due to fixing depends on R and increases for larger networks due to the additional redundancy. The estimation of E5 satellite biases with $\sigma_{\beta_m^k}=1$ cm requires 325 epochs for R=20, 750 epochs for R=750 and several thousand epochs for R=2.

Note that the estimation of integer ambiguities can be separated from the estimation of the real-valued ranges, range rates, ionospheric delays and biases by an orthogonal projection, i.e.

$$\tilde{z}_n = P_{\tilde{H}}^\perp z_n = P_{\tilde{H}}^\perp (AN + v_n) \tag{36}$$

with $$P_{\tilde{H}}^\perp = 1 - \tilde{H}(\tilde{H}^T \Sigma_R^{-1} \tilde{H})^{-1} \tilde{H} \Sigma_R^{-1} \tag{37}$$

where the measurement sensitivity matrix $\tilde{H}$ excludes the ambiguity part, i.e.

$$\tilde{H} = [H_g, H_g, H_I, H_{bR}, H_{bS}] \tag{38}$$

The Kalman filter based state estimation of (29)-(35) is then applied to the projected measurements.

B. Partial Ambiguity Resolution

Figure 8:
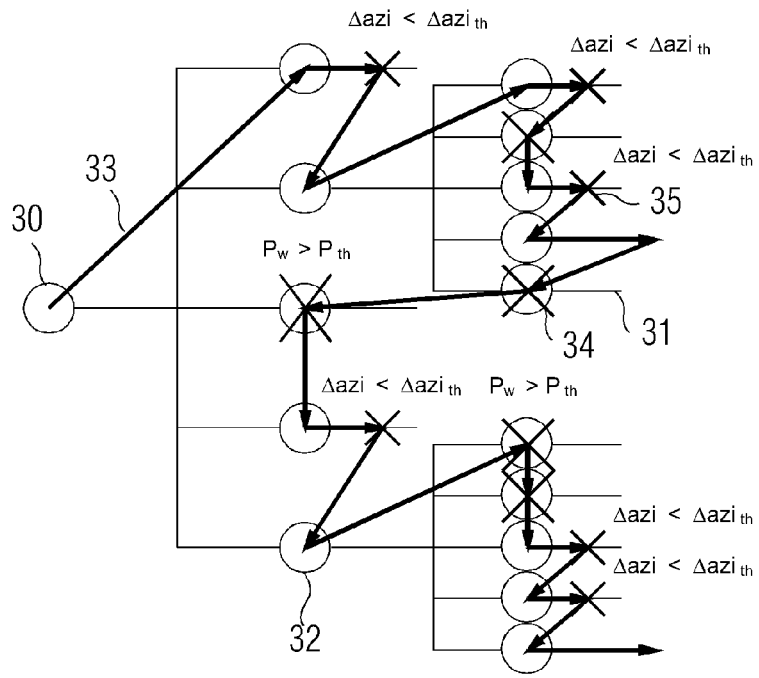
FIG. 8 shows a search tree where each horizontal branch refers to a fixing order.

For the partial ambiguity resolution 14 the computation 22 of an optimal sequential fixing order must be performed. The optimal sequential fixing order is determined by using a search tree 29 as depicted in FIG. 8. The search tree 29 comprises root 30 and a number of horizontal branches 31. Along the branches 31 nodes 32 represent the satellites 2. Thus, the sequences of nodes 32 along a branch 31 represent one possible fixing order of the satellites 2. It should be noted that the search is performed over a number of such search trees 29, each of them comprising another satellite as root 30. The assembly of search trees 29 represent all possible permutations of the satellites 2.

Each node 32 is further associated with an ambiguity and a probability of wrong fixing. This probability increases with the length of each branch 31 as more ambiguities have to be fixed. The goal of the search is to find the longest branch 31 for a predefined threshold on the probability of wrong fixing. The search is performed from left to right and from top to bottom. For example, FIG. 5 shows a search path 33. The optimum order is searched which maximizes the number of fixable ambiguities under the constraints on azimuthal separation and maximum probability of wrong fixing. If more than one order maximizes the number of fixable ambiguities, the order which achieves the lowest probability of wrong fixing is selected.

The proposed partial integer ambiguity resolution scheme maximizes the number of reliably fixable ambiguities with a predefined threshold on the overall probability of wrong fixing. This is a substantial difference to known sequential fixing schemes which maximize the reliability by a line search, i.e the first ambiguity to be fixed is chosen as the one with the smallest uncertainty among the real-valued ambiguities. Once this ambiguity is fixed, the remaining ones are corrected with respect to the fixed ambiguity. Then, the ambiguity with minimum uncertainty among the remaining ambiguities is fixed. This procedure is repeated until all ambiguities are fixed or a predefined threshold on the overall probability of wrong fixing is exceeded. Thus, the fixable ambiguities are determined by a one-dimensional line search. On the other hand, the proposed method allows a larger error rate for the first ambiguities to increase the number of fixable ambiguities with a predefined requirement on the overall probability of wrong fixing.

An exhaustive search would involve a large computational burden which can be reduced considerably by two constraints: The first one requires that a branch 31 in the tree 29 is further developed only if the probability of wrong fixing does not exceed a predefined threshold. The check for this criterion is represented by crosses 34 on the nodes 32. The probability of wrong fixing is computed from $$P_w = 1 - \prod_{k=1}^{n} P_s^{(k)} = \prod_{k=1}^{n} \Phi\left(\frac{1 - 2b_{\check{N}_{cond}^{(k)}}}{2\sigma_{\check{N}_{cond}^{(k)}}}\right) + \Phi\left(\frac{1 + 2b_{\check{N}_{cond}^{(k)}}}{2\sigma_{\check{N}_{cond}^{(k)}}}\right) - 1, \quad (39)$$

with the cumulative distribution $\Phi(z)$ of the normalized zero mean normal distribution, i.e.

$$\Phi(z) = \int_{-\infty}^{z} \frac{1}{\sqrt{2\pi}} e^{-\frac{x^2}{2}} dx. \quad (40)$$

The bias $b_{\check{N}_{cond}^{(k)}}$ of the k-th conditional ambiguity estimate is given by Teunissen [7] as $$b_{\check{N}_{k|k}} = \sum_{j=1}^{K-1} S_{kj}\alpha_1\lambda_1 \cdot b_{\varphi_{E1}^j} + \sum_{j=1}^{K-1} S_{kj}\alpha_2\lambda_2 \cdot b_{\varphi_{E5}^j} + \sum_{j=1}^{K-1}(S_{kj}\beta_1 + S_{k,j+(K-1)}b_1) \cdot b_{\rho_{E1}^j} + \sum_{j=1}^{K-1}(S_{kj}\beta_2 + S_{k,j+(K-1)}b_2) \cdot b_{\rho_{E5}^j} \quad (41)$$

where S denotes the mapping of measurement biases into conditional ambiguity biases. This mapping matrix is given by $$S = (L^T)^{-1} Z^T P (X^T \Sigma^{-1} X)^{-1} X^T \Sigma^{-1} \quad (42)$$

with the generalized geometry matrix X, the partial integer decorrelation matrix Z, the lower triangular matrix L that is obtained from the $LDL^T$ decomposition of the decorrelated covariance matrix, and the covariance matrix $\Sigma$ of the combined measurements.

An upper bound on the conditional ambiguity bias (41) can be derived from upper bounds on the environmental measurement biases, i.e.

$$b_{\varphi_{E1}^j} = \text{sign}(S_{kj}\alpha_1\lambda_1) \cdot b_{\varphi_{E1,max}^j} \quad (43)$$

with $$b_{\varphi_{E1,max}^j} = b_{\varphi_{E1,max}}(\theta = 0°) \cdot e^{-\frac{\theta(j)}{\zeta}},$$

which assumes an elevation dependant exponential profile for the measurement biases. A similar bound can be computed for the E5 phase biases, i.e.

$$b_{\varphi_{E5}^j} = \text{sign}(S_{kj}\alpha_2\lambda_2) \cdot b_{\varphi_{E5,max}^j} \quad (44)$$

with $$b_{\varphi_{E5,max}^j} = b_{\varphi_{E5,max}}(\theta = 0°) \cdot e^{-\frac{\theta(j)}{\zeta}}$$

and for the code measurements $$b_{\rho_{E1}^j} = \text{sign}(S_{kj}\beta_1 + S_{k,j+(K-1)}b_1) \cdot b_{\rho_{E1,max}^j} \quad (45)$$

with $$b_{\rho_{E1,max}^j} = b_{\rho_{E1,max}}(\theta = 0°) \cdot e^{-\frac{\theta(j)}{\zeta}}$$

$$b_{\rho_{E5}^j} = \text{sign}(S_{kj}\beta_2 + S_{k,j+(K-1)}b_2) \cdot b_{\rho_{E5,max}^j} \quad (46)$$

with $$b_{\rho_{E5,max}^j} = b_{\rho_{E5,max}}(\theta = 0°) \cdot e^{-\frac{\theta(j)}{\zeta}}.$$

The first search constraint refers to the probability of wrong fixing and reduces the number of possible orders by several orders of magnitude.

The second constraint demands a minimum azimuthal separation between two consecutive fixings. This constraint is represented in FIG. 8 by crosses 35 along the branches 31 between nodes 32. The threshold for the minimal azimuthal separation is a linear function of the number of fixed ambiguities whereas the requirement is most strict for the second fixing and is weakened for further fixings, i.e.

$$\Delta azi = |azi^{(k)} - azi^{(k+1)}| \stackrel{!}{\geq} \Delta azi_{th}^{(k)} = \frac{K-1-k}{K-2} \cdot \Delta azi_{th}^{(0)}, \quad (47)$$

where the threshold parameter has been set to $azi_{th}^{(0)} = 90°$. This second constraint has derived from the observation that a low fixing error rate requires a good geometry. This constraint is not equivalent to the maximization of the number of fixable ambiguities such that the number of fixable ambiguities is lowered by 1 for one particular geometry. However, the search space is reduced substantially.

A particularly reliable partial ambiguity resolution is obtained by combining the phase and code measurements in a geometry-preserving, ionosphere-free multi-frequency code carrier combinations of maximum ambiguity discrimination (defined as ratio between wavelength and standard deviation of combined noise). The code noise and code multipath can be efficiently reduced by carrier smoothing which has been introduced by Hatch in [1].

Figure 9:
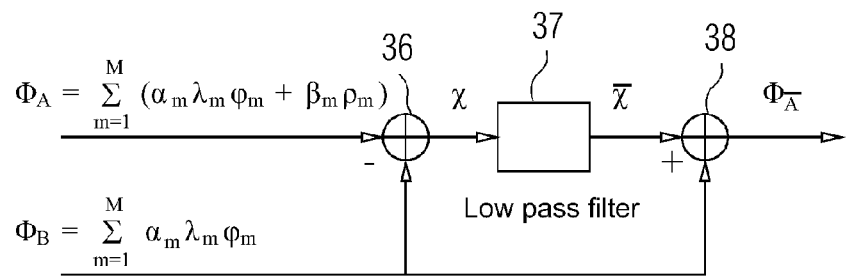
FIG. 9 shows a functional diagram of a unit for carriers smoothing of a multi-frequency code-carrier linear combination.

FIG. 9 shows the smoothing of a multi-frequency mixed code-carrier combination with a low noise phase-only combination. The difference between both combinations is formed in a subtractor 36. The difference between both combinations is geometry free, i.e. it eliminates the true range, the clock offsets and the tropospheric delay. The remaining noise and multipath are suppressed by a low pass filter 37. The integer ambiguities are not affected by the filtering so that the integer ambiguities of the smoothed combination equal the integer ambiguities of the unsmoothed code-carrier combination. After filtering, the phase-only combination is added in a summer 38 to recover the range information. Note that the phase only combination is considered twice with different signs such that its ambiguities do not appear in the smoothed output.

Hatch has used no linear combinations to eliminate the ionospheric delay, i.e. he chose the L1 C/A code measurement for the upper input and the L1 phase measurement for the lower input. As the ionosphere affects the code and phase with opposite signs, the doubled ionospheric delay enters the low pass filter. Thus, the smoothed output is affected by the ionospheric delay of the current and previous time instants. Hwang et al. [2] and Mc Graw et al. [3] have suggested a dual-frequency divergence-free and a dual frequency ionosphere-free carrier smoothing. The divergence-free smoothing removes the ionospheric delay from the previous epochs and only leaves the ionospheric delay of the current epoch. The dual-frequency ionosphere-free smoothing eliminates the ionospheric delay completely but requires a certain smoothing period to overcome the noise amplification from the dual-frequency combination. Therefore, Günther and Henkel have suggested a triple frequency ionosphere-free carrier smoothing in [4] to achieve reduced noise, ionosphere-free carrier smoothed code measurements. A first order low pass filter is typically used for smoothing and implemented as $$\overline{\chi}(t_k) = \left(1 - \frac{1}{\tau}\right) \cdot \overline{\chi}(t_{k-1}) + \frac{1}{\tau} \cdot \chi(t_k) \qquad (48)$$

with the smoothing constant $\tau$. For time-continuous signals, the transfer function can be expressed in Laplace domain as $$H(s) = \frac{1}{\tau s + 1}, \qquad (49)$$

and for time-discrete signals, the Z-transform is used to obtain $$H(z) = \frac{1}{\tau - (\tau - 1)z^{-1}}. \qquad (50)$$

The recursive form of (48) can be solved for $\overline{\chi}(t_k)$ by series expansion:

$$\overline{\chi}(t_k) = \frac{1}{\tau} \cdot \sum_{n=0}^{k-2} \left(1 - \frac{1}{\tau}\right)^n \cdot \chi(t_{k-n}) + \left(1 - \frac{1}{\tau}\right)^{k-1} \cdot \chi(t_1). \qquad (51)$$

Assuming independent measurements $\chi(t_k)$, the variance of $\overline{\chi}(t_k)$ is given by $$\sigma_{\overline{\chi}}^2 = \frac{1}{\tau^2} \cdot \frac{1 - \left(1 - \frac{1}{\tau}\right)^{2(k-1)}}{1 - \left(1 - \frac{1}{\tau}\right)^2} \cdot \sigma_\chi^2 + \left(1 - \frac{1}{\tau}\right)^{2(k-1)} \cdot \sigma_\chi^2 = \qquad (52)$$

$$= \frac{1}{2\tau - 1} \cdot \sigma_\chi^2 + \frac{2\tau - 2}{2\tau - 1}\left(1 - \frac{1}{\tau}\right)^{2(k-1)} \cdot \sigma_\chi^2,$$

which converges for large k to $$\lim_{k \to \infty} \sigma_{\overline{\chi}}^2 = \frac{1}{2\tau - 1} \cdot \sigma_\chi^2. \qquad (53)$$

In the case of zero-mean white Gaussian noise, the ideal averaging would be $$\overline{\chi}(t_k) = \frac{1}{k} \cdot \sum_{n=0}^{k-1} \chi(t_{k-n}), \qquad (54)$$

with the variance $$\sigma_{\overline{\chi}}^2 = \frac{1}{k} \cdot \sigma_\chi^2,$$

which converges to 0 for large k. However, the low pass filter of (48) has been preferred so far as it can better adapt to changing conditions, e.g. code-multipath which is not perfectly stationary.

The multi-frequency GP-IF mixed code-carrier combination $\Phi_A$ and the GP-IF phase-only combination $\Phi_B$ can be jointly optimized to maximize the ambiguity discrimination of the smoothed combination $\Phi_{\overline{A}}$, i.e.

$$\max_{\substack{\alpha_1, \ldots, \alpha_M \\ \beta_1, \ldots, \beta_M \\ \alpha_1', \ldots, \alpha_{M'}}} D = \frac{\lambda}{2\sigma_{\Phi_{\overline{A}}}}, \qquad (55)$$

with the smoothed variance $$\sigma_{\Phi_{\overline{A}}}^2 = E\{(\overline{\chi}(t_k) + \Phi_B(t_k))^2\} - \left(E\{\Phi_{\overline{A}}(t_k)\}\right)^2 \qquad (56)$$

$$= E\{\overline{\chi}^2(t_k) + 2\overline{\chi}(t_k)\Phi_B(t_k) + \Phi_B^2(t_k)\} - \left(E\{\Phi_{\overline{A}}(t_k)\}\right)^2$$

$$= \frac{1}{2\tau - 1} \cdot (\sigma_A^2 + \sigma_B^2 - 2\sigma_{AB}) + \frac{2}{\tau} \cdot \sigma_{AB} - \frac{2}{\tau} \cdot \sigma_B^2 + \sigma_B^2$$

$$= \kappa_1 \cdot \sigma_A^2 + \kappa_2 \cdot \sigma_B^2 + \kappa_3 \cdot \sigma_{AB},$$

with $$\kappa_1 = \frac{1}{2\tau - 1}, \kappa_2 = 1 + \frac{1}{2\tau - 1} - \frac{2}{\tau}, \kappa_3 = \frac{2}{\tau} - \frac{2}{2\tau - 1}, \qquad (57)$$

and the covariance $\sigma_{AB}$ between the linear combinations $\Phi_A$ and $\Phi_B$. The choice of the phase weighting coefficients $\alpha_m$ and of the code weighting coefficients $\beta_m$ of the multi-frequency code carrier combination is constrained by a few conditions: The linear combination should preserve the geometry, i.e.

$$\sum_{m=1}^{M} \alpha_m = 1, \quad (58)$$

and eliminate the ionospheric delay of first order, i.e.

$$\sum_{m=1}^{M} (\alpha_m - \beta_m) q_{1m}^2 = 0 \text{ with } q_{1m} = \frac{f_1}{f_m}. \quad (59)$$

Moreover, the linear combination shall preserve the integer nature of ambiguities, i.e.

$$\alpha_m = \frac{j_m \lambda}{\lambda_m}, \quad (60)$$

with the integer coefficients $j_m$ and the combination wavelength $\lambda$ which is written as $$\lambda = \tilde{\lambda}_0 \cdot w_\phi \text{ with } \tilde{\lambda}_0 = \frac{1}{\sum_{m=1}^{M} \frac{j_m}{\lambda_m}} \text{ and } w_\phi = 1 - \sum_{m=1}^{M} \beta_m. \quad (61)$$

The code weight $\beta_2$ is obtained from the geometry-preserving constraint, i.e.

$$\beta_2 = 1 - \sum_{m=1}^{M} \alpha_m - \beta_1 - \sum_{m=3}^{M} \beta_m, \quad (62)$$

and the code weight $\beta_1$ is computed from the ionosphere-free constraint, i.e.

$$\beta_1 = \sum_{m=1}^{M} \alpha_m q_{1m}^2 - \sum_{m=2}^{M} \beta_m q_{1m}^2 \quad (63)$$

$$= \sum_{m=1}^{M} \alpha_m q_{1m}^2 - \left(1 - \sum_{m=1}^{M} \alpha_m - \beta_1 - \sum_{m=3}^{M} \beta_m\right) q_{12}^2 - \sum_{m=3}^{M} \beta_m q_{1m}^2.$$

Replacing $\alpha_m$ by (60), using (61), and solving for $\beta_1$ yields $$\beta_1 = s_1 + s_2 w_\phi + \sum_{m=3}^{M} s_m \beta_m, \quad (64)$$

with $$s_1 = -\frac{q_{12}^2}{1 - q_{12}^2} \quad (65)$$

$$s_2 = \frac{\tilde{\lambda}}{1 - q_{12}^2} \cdot \sum_{m=1}^{M} \frac{j_m}{\lambda_m} \cdot (q_{12}^2 + q_{1m}^2) \quad (66)$$

$$s_m = \frac{q_{12}^2 - q_{1m}^2}{1 - q_{12}^2} \, \forall \, m \in \{3, \ldots, M\}. \quad (67)$$

Eq. (64) is used to rewrite (62) as $$\beta_2 = 1 - s_1 + (-1 - s_2) w_\phi - \sum_{m=3}^{M} (1 + s_m) \beta_m, \quad (68)$$

which enables us to write the variance of the code carrier combination as a function of $w_\phi$ and $\beta_m$, $m \geq 3$:

$$\sigma_A^2 = \tilde{\eta}^2 w_\phi^2 + \left(s_1 + s_2 w_\phi + \sum_{m=3}^{M} s_m \beta_m\right)^2 \sigma_{\rho_1}^2 + \quad (69)$$

$$\left(1 - s_1 + (-1 - s_2) w_\phi - \sum_{m=3}^{M} (1 + s_m) \beta_m\right)^2 \sigma_{\rho_2}^2 + \sum_{m=3}^{M} \beta_m^2 \sigma_{\rho_m}^2$$

with $$\tilde{\eta}^2 = \tilde{\lambda}^2 \cdot \sum_{m=1}^{M} \frac{j_m^2}{\lambda_m^2} \sigma_{\phi_m}^2.$$

The code carrier combination (labeled A) is smoothed by a phase only combination (labeled A) which is also geometry-preserving and ionosphere-free. Combining these two constraints gives the phase weight $\alpha_{1'}$ of the phase-only combination, i.e.

$$\alpha_{1'} = -\frac{q_{12}^2}{1 - q_{12}^2} + \sum_{m=3}^{M} \frac{q_{12}^2 - q_{1m}^2}{1 - q_{12}^2} \cdot \alpha_{m'} = c_0 + c_1^T \alpha' \quad (70)$$

with $\alpha' = [\alpha_{3'}, \ldots, \alpha_{M'}]^T$. The second phase weight $\alpha_{2'}$ is obtained similarly as $$\alpha_{2'} = \frac{1}{1 - q_{12}^2} - \sum_{m=3}^{M} \frac{1 - q_{1m}^2}{1 - q_{12}^2} \cdot \alpha_{m'} = d_0 + d_1^T \alpha', \quad (71)$$

which enables us to express $\sigma_B^2$ as a function of $\alpha'$:

$$\sigma_B^2 = (c_0 + c_1^T \alpha')^2 \cdot \sigma_\phi^2 + (d_0 + d_1^T \alpha')^2 \cdot \sigma_\phi^2 + \alpha'^T \alpha' \cdot \sigma_\phi^2 \quad (72)$$

The covariance $\sigma_{AB}$ is obtained using (60), (61), (70) and (71), i.e.

$$\sigma_{AB} = \sum_{m=1}^{M} \alpha_m \alpha_{m'} \cdot \sigma_\phi^2 \quad (73)$$

$$= \sum_{m=1}^{M} \frac{j_m \tilde{\lambda}}{\lambda_m} \cdot w_\phi \cdot \alpha_{m'} \cdot \sigma_\phi^2$$

$$= \frac{j_1 \tilde{\lambda}}{\lambda_1} \sigma_\phi^2 \cdot (c_0 + c_1^T \alpha') \cdot w_\phi + \frac{j_2 \tilde{\lambda}}{\lambda_2} \sigma_\phi^2 \cdot (d_0 + d_1^T \alpha') \cdot w_\phi +$$

$$\sum_{m=3}^{M} \frac{j_m \tilde{\lambda}}{\lambda_m} \sigma_\phi^2 \cdot \alpha_{m'} \cdot w_\phi$$

$$= (v_0 + v_1^T \alpha') \cdot w_\phi \cdot \sigma_\phi^2.$$

Therefore, the maximization of the ambiguity discrimination has to be performed only over $w_\phi$, $\beta_3, \ldots, \beta_M$ and $\alpha_{3'}, \ldots, \alpha_{M'}$. This equivalent to $$\frac{\partial D}{\partial w_\phi} \stackrel{!}{=} 0, \tag{74}$$

and $$\frac{\partial D}{\partial \beta_m} \stackrel{!}{=} 0 \, \forall \, m \in \{3, \ldots, M\}, \tag{75}$$

and $$\frac{\partial D}{\partial \alpha_{m'}} \stackrel{!}{=} 0 \, \forall \, m \in \{3, \ldots, M\}. \tag{76}$$

The first constraint is rewritten using (56), (61), (69), (72) and (73) as $$\kappa_1 \cdot \left[ \left( s_1 + s_2 w_\phi + \sum_{m=3}^{M} s_m \beta_m \right) \left( s_1 + \sum_{m=3}^{M} s_m \beta_m \right) \sigma_{\rho_1}^2 + \right.$$

$$\left( 1 - s_1 - (1+s_2)w_\phi - \sum_{m=3}^{M} (1+s_m)\beta_m \right)$$

$$\left( 1 - s_1 - \sum_{m=3}^{M} (1+s_m)\beta_m \right) \sigma_{\rho_2}^2 + \sum_{m=3}^{M} \beta_m^2 \sigma_{\rho_m}^2 \right] +$$

$$\kappa_2 \cdot \sigma_\phi^2 \cdot \left[ (c_0 + c_1^T \alpha')^2 + (d_0 + d_1^T \alpha')^2 + a'^T \alpha' \right] +$$

$$\kappa_3 \cdot (v_0 + v_1^T \alpha') \cdot w_\phi \cdot \sigma_\phi^2 = 0. \tag{77}$$

The second constraint is equivalent to $$s_m \sigma_{\rho_1}^2 \left( s_1 + s_2 w_\phi + \sum_{l=3}^{M} s_l \beta_l \right) -$$

$$(1+s_m)\sigma_{\rho_2}^2 \left( -s_1 - (1+s_2)w_\phi - \sum_{l=3}^{M} (1+s_l)\beta_l \right) + \beta_m \sigma_{\rho_m}^2 = 0, \tag{78}$$

and can be written in matrix-vector-notation as $$A \cdot [\beta_3, \ldots, \beta_M]^T + b \cdot w_\phi + c = 0 \tag{79}$$

with $$A_{m,l} = s_l s_m \sigma_{\rho_1}^2 + (1+s_l)(1+s_m)\sigma_{\rho_2}^2 + \sigma_{\rho_m}^2 \delta(m-l)$$

$$b_m = s_2 s_m \sigma_{\rho_1}^2 + (1+s_m)(1+s_2)\sigma_{\rho_2}^2$$

$$c_m = s_1 s_m \sigma_{\rho_1}^2 - (1+s_m)(-s_1)\sigma_{\rho_2}^2 \tag{80}$$

where $\delta(m-l)$ is 1 for m=l and otherwise 0. Solving (79) for $\beta_m$ gives $$[\beta_3, \ldots, \beta_M]^T = -A^{-1}(c + b \cdot w_\phi) \tag{81}$$

The third constraint is expanded to $$2\kappa_2 \cdot (c_0 c_{1,m} + d_0 d_{1,m})\sigma_\phi^2 + 2\kappa_2 (c_1^T c_{1,m} + d_1^T d_{1,m})\sigma_\phi^2 \cdot \alpha' + 2\kappa_2 \sigma_\phi^2 \cdot \alpha_m + \kappa_3 v_{1,m}\sigma_\phi^2 \cdot w_\phi = 0 \tag{82}$$

where $c_{1,m}$ and $d_{1,m}$ denote the (m−2)-th elements of $C_1$ and $d_1$. Eq. (82) can be simplified to $$\zeta_m^T \alpha' + \delta_m w_\phi + \epsilon_m = 0 \, \forall m \in \{3, \ldots M\} \tag{83}$$

These M−2 constraints can be written in matrix-vector notation as $$X\alpha' + \delta \cdot w_\phi + \epsilon = 0, \tag{84}$$

with $$X = \begin{bmatrix} \zeta_3^T \\ \vdots \\ \zeta_M^T \end{bmatrix}, \delta = \begin{bmatrix} \delta_3 \\ \vdots \\ \delta_M \end{bmatrix}, \epsilon = \begin{bmatrix} \epsilon_3 \\ \vdots \\ \epsilon_M \end{bmatrix}. \tag{85}$$

Solving for $\alpha'$ yields $$\alpha' = -X^{-1}(\delta \cdot w_\phi + \epsilon) \tag{86}$$

The code weights $\beta_m$ of (81) and the phase weights $\alpha_{m'}$ of (86) are inserted in (77) to obtain a constraint that depends only on $w_\phi$, i.e.

$$\kappa_1 \cdot [(s_1 + s_2 w_\phi - t^T A^{-1}(c+bw_\phi))(s_1 - t^T A^{-1}(c+bw_\phi)) \cdot \sigma_{\rho_1}^2 + (1-s_1-(1+s_2)w_\phi + u^T A^{-1}(c+bw_\phi))(1-s_1+u^T A^{-1}(c+bw_\phi)) \cdot \sigma_{\rho_2}^2 + (c+bw_\phi)^T A^{-T} \Sigma A^{-1}(c+bw_\phi)]\kappa_2 \cdot \sigma_\phi^2 \cdot [(c_0 - c_1^T X^{-1}(\delta w_\phi + \epsilon))^2 + (d_0 - d_1^T X^{-1}(\delta w_\phi + \epsilon))^2 + (\delta w_\phi + \epsilon)^T X^{-T} X^{-1}(\delta w_\phi + \epsilon)]\kappa_3 \cdot [(v_0 - v_1^T X^{-1}(\delta w_\phi + \epsilon)) w_\phi \sigma_\phi^2]/2 = 0 \tag{87}$$

which is a quadratic function of $w_\phi$. It can be shown that the square terms cancel which leaves a linear equation, i.e.

$$r_1 + r_2 \cdot w_\phi = 0 \tag{88}$$

with $$r_1 = \kappa_1 \cdot [(s_1 - t^T A^{-1}c)^2 \cdot \sigma_{\rho_1}^2 + (1-s_1 + u^T A^{-1}c)^2 \cdot \sigma_{\rho_2}^2 + c^T A^{-T}\Sigma A^{-1}c] + \kappa_2 \sigma_\phi^2 \cdot [c_0^2 - 2c_0 c_1^T X^{-1}\epsilon + (c_1^T X^{-1}\epsilon)^2 + d_0^2 - 2d_0 d_1^T X^{-1}\epsilon + (d_1^T X^{-1}\epsilon)^2 + \epsilon^T X^{-1}\epsilon] \tag{89}$$

and $$r_2 = \kappa_1 \cdot [((s_1 - t^T A^{-1}c)(-t^T A^{-1}b) + (s_2 - t^T A^{-1}b)(s_2 - t^T A^{-1}c)) \cdot \sigma_{\rho_1}^2 + ((1-s_1 + u^T A^{-1}c)(u^T A^{-1}b) - (1+s_2 - u^T A^{-1}b)(1-s_1 + u^T A^{-1}c)) \cdot \sigma_{\rho_2}^2 + (c^T A^{-T}\Sigma A^{-1}b + b^T A^{-T}\Sigma A^{-1}c)] + \kappa_2 \sigma_\phi^2 \cdot [-2c_0 c_1^T X^{-1}\delta + 2c_1^T X^{-1}\epsilon \cdot c_1^T X^{-1}\delta - 2d_0 d_1^T X^{-1}\delta + 2d_1^T X^{-1}\epsilon \cdot d_1^T X^{-1}\delta + 2\epsilon^T X^{-T} X^{-1}\delta] + \kappa_3 \cdot [(v_0 - v_1^T X^{-1}\epsilon)\sigma_\phi^2]/2 \tag{90}$$

Solving (88) for $w_\phi$ yields the optimum phase weighting:

$$w_{\phi_{opt}} = -\frac{r_1}{r_2}, \tag{91}$$

which is then used in (81) and (86) to compute $\beta_m$, $m \in \{3, \ldots, M\}$, and $\alpha'$. Replacing $\alpha'$ in (70) and (71) yields the remaining coefficients of the phase-only combination. The code weights $\beta_1$ and $\beta_2$ are determined from (64), (62) and the wavelength from (61) which enables the computation of $\alpha_m$ from (60). The optimized carrier smoothed code carrier combination as well as a carrier smoothed phase-only combination improve the reliability of the float solution, and thus, the number of reliably fixable ambiguities.

Figure 10:
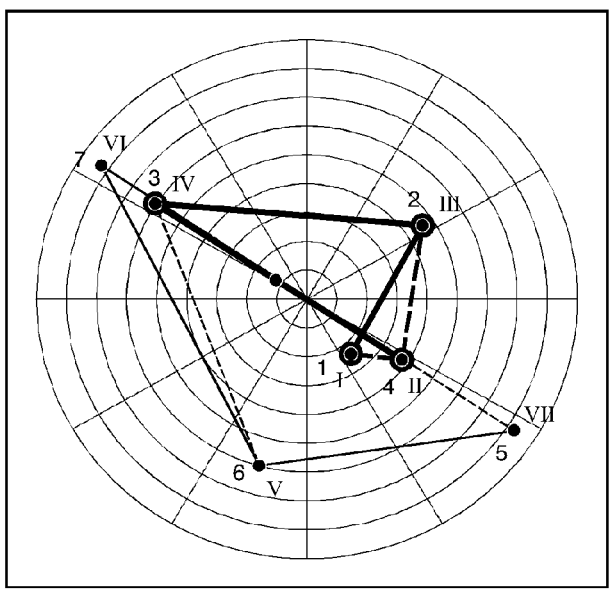
FIG. 10 is a sky plot for of a fixing sequence according to the method described herein and a fixing sequence according to a prior art method.

FIG. 10 shows a skyplot for two sequential fixing orders: The SOFOS (Sequential Optimum Fixing Order Search) method, that has been described herein, and the SAVO (Sequential fixing based on Ascending Variance Order) algorithm. The SOFOS method takes biases into consideration and executes an combined forward-backward search as depicted in FIG. 8.

Figure 11:
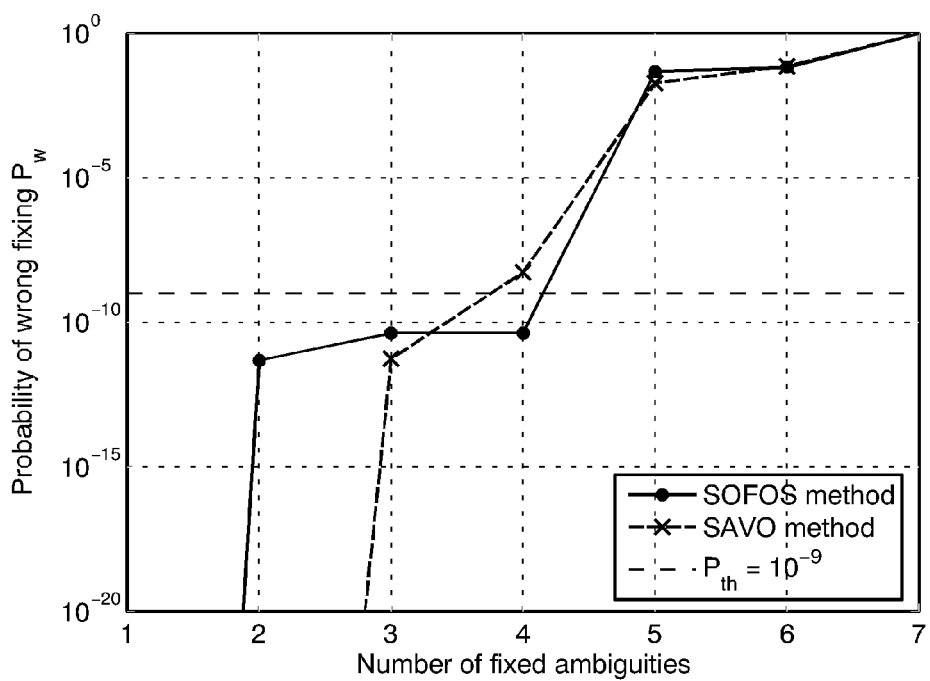
FIG. 11 is a diagram showing the probability of wrong fixing as a function of the number of fixed ambiguities for the fixing methods from FIG. 10.

FIG. 11 shows a diagram, in which the probability of wrong fixing is depicted for the sequential fixing order from FIG. 10. As can be recognized from FIGS. 10 and 11, the SOPHOS method enables the fixing of four ambiguities compared to three ambiguities for the SAVO (Sequential fixing based on Ascending Variance Order) algorithm.

Figure 12:
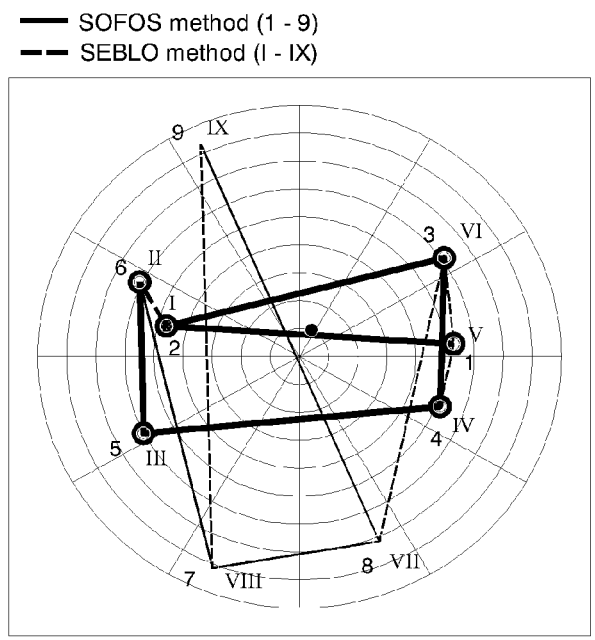
FIG. 12 is a sky plot of a fixing sequence according to the method described herein and a fixing sequence according to another prior art method.
Figure 13:
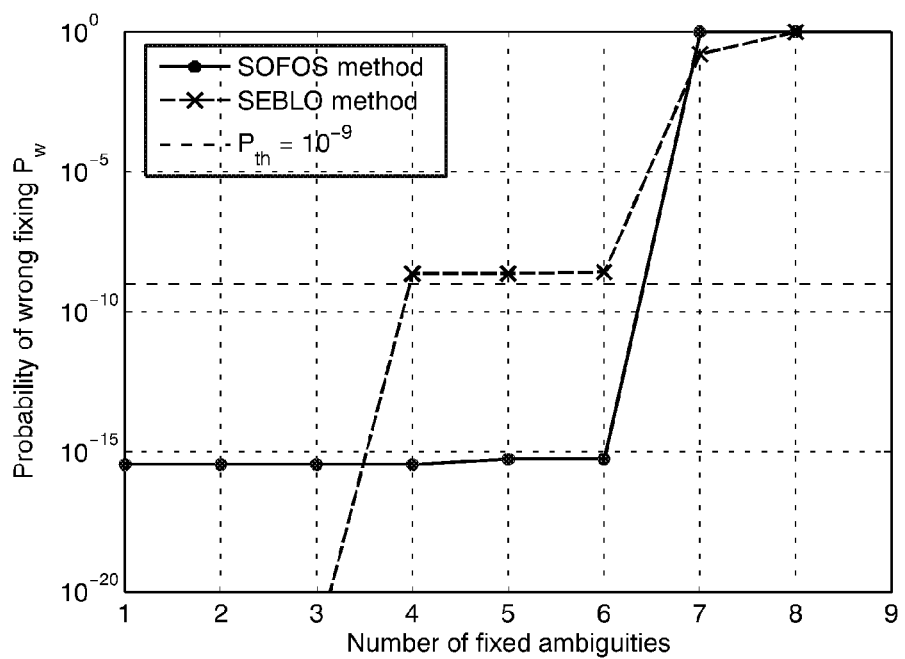
FIG. 13 is diagram showing the probability of wrong fixing as a function of the number of fixed ambiguities for the method from FIG. 12.

FIG. 12 and FIG. 13 show a similar skyplot and a similar diagram for a further comparison of the SOFOS (Sequential Optimum Fixing Order Search) method and the SEBLO (SEquential BLewitt's fixing Order) algorithm that includes biases but executes only a forward search. As can be recognized form FIGS. 12 and 13, the SOFOS method enables the fixing of six ambiguities compared to three ambiguities for the SEBLO algorithm.

Figure 14:
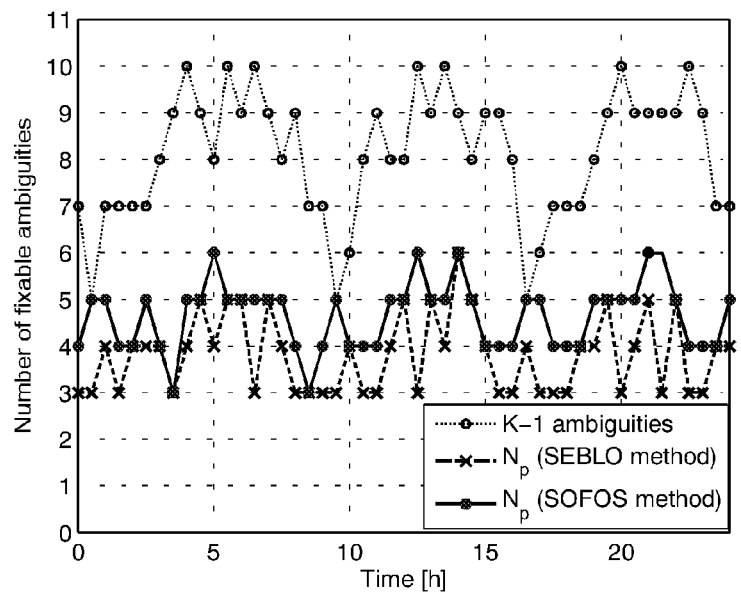
FIG. 14 is a diagram depicting the number of fixable ambiguities over time for the method form FIGS. 12 and 13.

FIG. 14 shows a diagram that contains a comparison between the SOFOS method and the SEBLO algorithm over time and that demonstrates the benefit of SOFOS over SEBLO for a simulated Galileo geometry as seen from the Institute of Communications and Navigation in Munich, Germany. It can be recognized from FIG. 14 that the SOFOS method generally enables more ambiguities to be resolved than the SEBLO algorithm.

Figure 15:
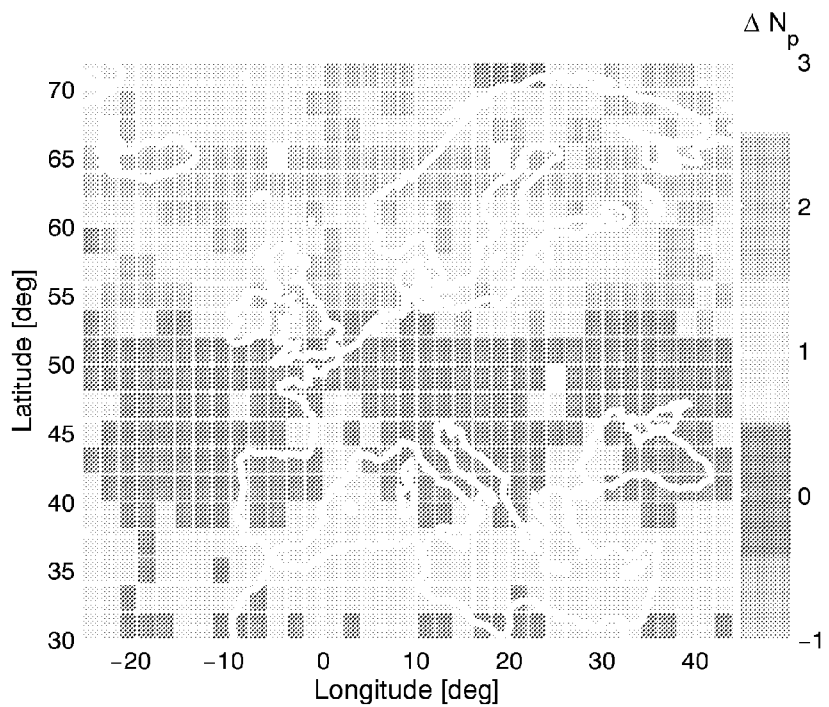
FIG. 15 is a map in which the differences in fixable ambiguities for the methods form

The same it true if the geographic distribution is considered. FIG. 15 shows a map illustrating the results of a comparison of two sequential partial fixing strategies including an exponential bias profile: The difference of the worst-case number of fixable ambiguities between SOFOS and SEBLO indicates the benefit of the forward-backward search according to SOFOS over a pure forward search as executed in the SEBLO algorithm.

Figure 16:
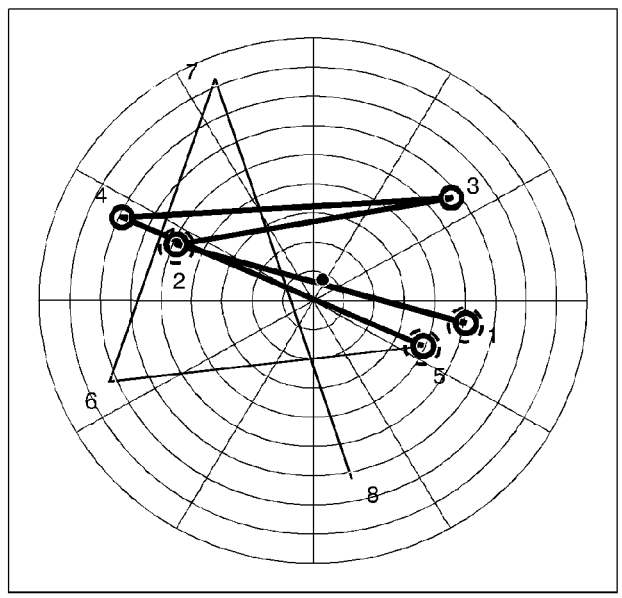
FIG. 16 is a sky plot showing two fixing sequences according to a method described herein and according to a prior art method.
Figure 17:
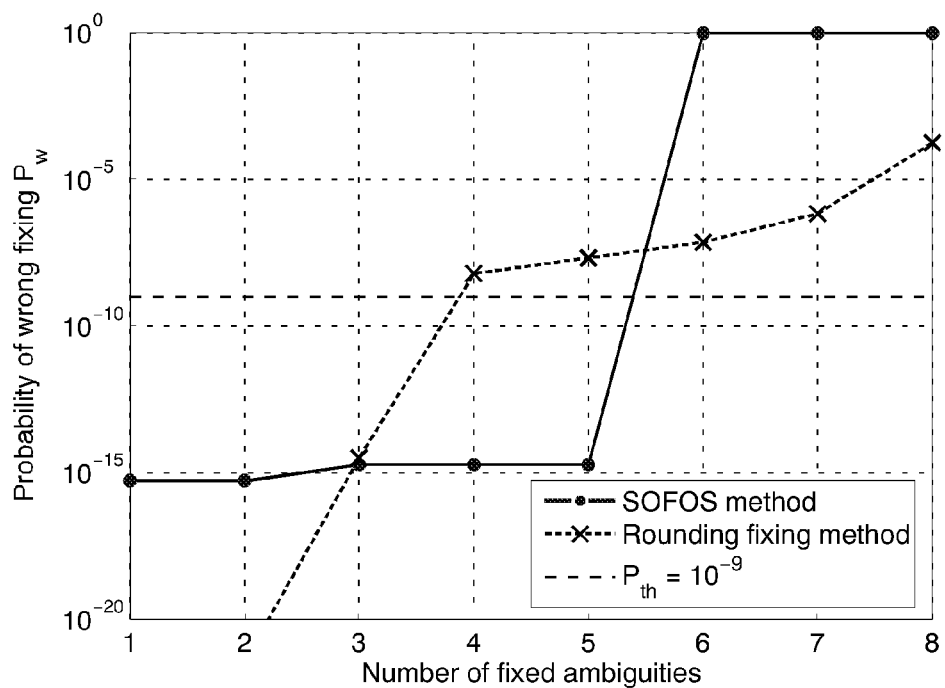
FIG. 17 is a diagram showing the probability of wrong fixing as a function of the number of fixed ambiguities for the sky plot from FIG. 16.

FIGS. 16 and 17 illustrate a comparison between the SOFOS method and a method with simple instantaneous rounding: The consideration of the correlation, the exponential bias profile and the forward-backward search enables the fixing of 5 instead of 2 ambiguities.

Figure 18:
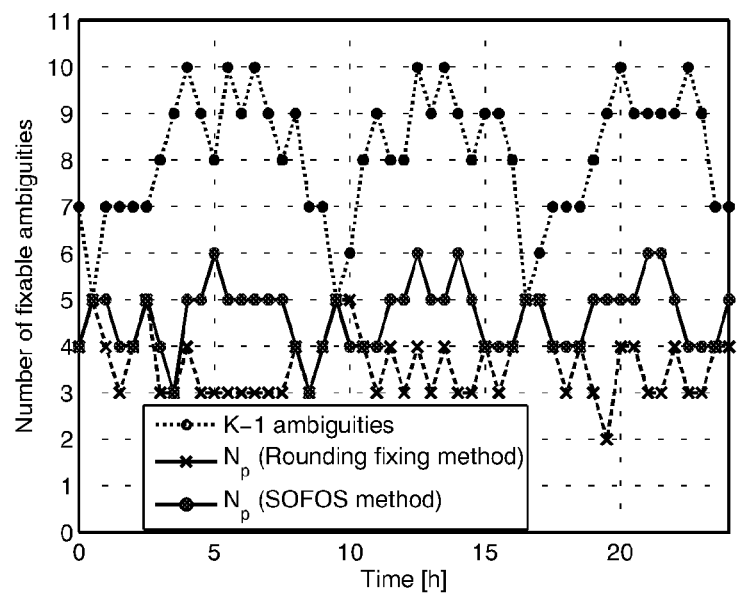
FIG. 18 is a diagram depicting the number of fixable ambiguities over time for the method from FIGS. 16 and 17.
Figure 19:
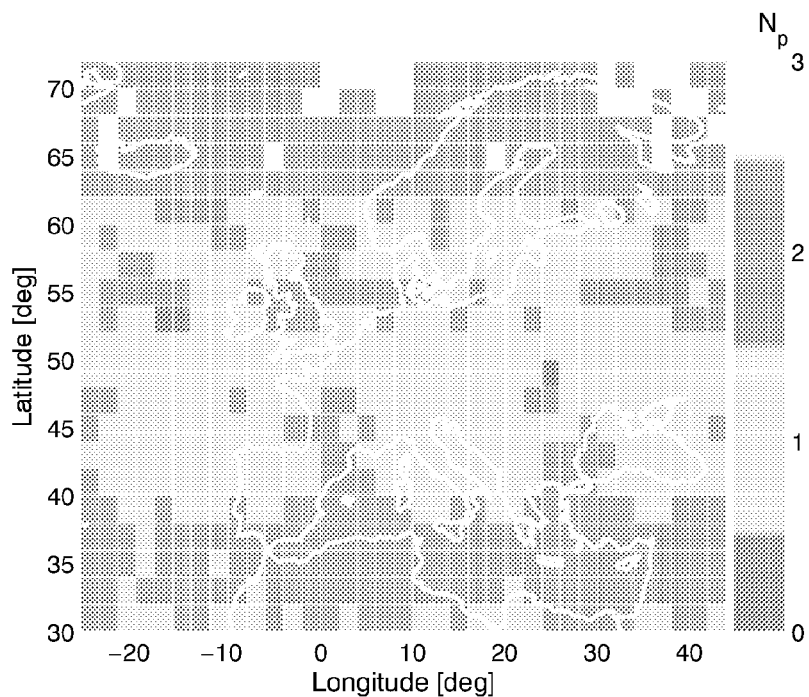
FIG. 19 is a map showing the differences of fixed ambiguities for the methods from FIGS. 16 and 17.

FIG. 18 illustrates a comparison between the SOFOS method and simple instantaneous rounding over time and demonstrates the benefit of using SOFOS over instantaneous rounding for a simulated Galileo geometry as seen from the Institute of Communications and Navigation in Munich, Germany FIG. 19 finally shows a map that illustrates a comparison between SOFOS and instantaneous rounding: The difference of the worst-case number of fixable ambiguities between SOFOS and instantaneous rounding indicates the benefit of the sequential fixing in an optimized order.

Once the optimal fixing order is found, it is used for partial fixing of the ambiguities. This enables an accurate ionospheric delay estimation with the means of a smoothed geometry-free, ionosphere-preserving, integer-preserving code carrier combination.

C. Multi-Frequency Ionospheric Delay Estimation

A geometry-free, ionosphere-preserving (GF, IP) multi-frequency code carrier linear combination $\Phi_A$ and a geometry-free, ionosphere-preserving phase-only linear combination $\Phi_B$ shall be used for ionospheric delay estimation. The multi-frequency code carrier combination has to include the same integer ambiguity combination as the geometry-preserving, ionosphere-free code carrier combination that has been used in the previous step for partial ambiguity resolution. A joint optimization of both combinations is performed to maximize the ambiguity discrimination of the smoothed combination $\Phi_{\bar{A}}$, i.e.

$$\max_{\substack{\alpha_1,\ldots,\alpha_M \\ \beta_1,\ldots,\beta_M \\ \alpha_{1'},\ldots,\alpha_{M'}}} D = \frac{\lambda}{2\sigma_{\Phi_{\bar{A}}}}, \quad (92)$$

where the variance of the smoothed solution is given by $$\sigma_{\Phi_{\bar{A}}}^2 = E\{(\bar{X}(t_k) + \Phi_B(t_k))^2\} - \left(E\{\Phi_{\bar{A}}(t_k)\}\right)^2 \quad (93)$$

$$= E\{\bar{X}^2(t_k) + 2\bar{X}(t_k)\Phi_B(t_k) + \Phi_B^2(t_k)\} - \left(E\{\Phi_{\bar{A}}(t_k)\}\right)^2$$

$$= \frac{1}{2\tau - 1} \cdot (\sigma_A^2 + \sigma_B^2 - 2\sigma_{AB}) + \frac{2}{\tau} \cdot \sigma_{AB} - \frac{2}{\tau} \cdot \sigma_B^2 + \sigma_B^2$$

$$= \kappa_1 \cdot \sigma_A^2 + \kappa_2 \cdot \sigma_B^2 + \kappa_3 \cdot \sigma_{AB},$$

with $$\kappa_1 = \frac{1}{2\tau - 1}, \kappa_2 = 1 + \frac{1}{2\tau - 1} - \frac{2}{\tau}, \kappa_3 = \frac{2}{\tau} - \frac{2}{2\tau - 1}. \quad (94)$$

and the covariance $\sigma_{AB}$ between the linear combinations $\Phi_A$ and $\Phi_B$. The choice of the weighting coefficients $\alpha_m$ and $\beta_m$ of the phase and code measurements of the first linear combinations constrained by a few conditions. First, the linear combination should be geometry-free (GF), i.e.

$$\sum_{m=1}^{M} (\alpha_m - \beta_m) = 0, \quad (95)$$

and ionosphere-preserving (IP), i.e.

$$\sum_{m=1}^{M} (\alpha_m - \beta_m) q_{1m}^2 = 1 \quad mit \quad q_{1m} = \frac{f_1}{f_m}. \quad (96)$$

Moreover, the linear combination shall maintain the integer nature of ambiguities, i.e.

$$\alpha_m = \frac{j_m \tilde{\lambda}}{\lambda_m} \cdot w_\phi \quad mit \quad \tilde{\lambda} = \frac{1}{\sum_{m=1}^{M} \frac{j_m}{\lambda_m}} \quad (97)$$

with the overall phase weight $w_\phi = \sum_{m=1}^{M} \alpha_m$ and the same integer set $j_m$ as in the previous section. The code weight $\beta_2$ is obtained from the GF constraint, i.e.

$$\beta_2 = -\sum_{m=1}^{M} \alpha_m - \beta_1 - \sum_{m=3}^{M} \beta_m, \quad (98)$$

and the code weight $\beta_1$ is derived from the IP constraint, i.e.

$$\beta_1 = \sum_{m=1}^{M} \alpha_m q_{1m}^2 - \sum_{m=2}^{M} \beta_m q_{1m}^2 - 1 \quad (99)$$

$$= \sum_{m=1}^{M} \alpha_m q_{1m}^2 - \left(-\sum_{m=1}^{M} \alpha_m - \beta_1 - \sum_{m=3}^{M} \beta_m\right) q_{12}^2 - \sum_{m=3}^{M} \beta_m q_{1m}^2 - 1$$

Replacing $\alpha_m$ by (97) and solving for $\beta_1$ yields $$\beta_1 = s_1 + s_2 w_\phi + \sum_{m=3}^{M} s_m \beta_m \qquad (100)$$

with $$s_1 = -\frac{1}{1 - q_{12}^2} \qquad (101)$$

$$s_2 = \frac{\tilde{\lambda}}{1 - q_{12}^2} \cdot \sum_{m=1}^{M} \frac{j_m}{\lambda_m} \cdot (q_{12}^2 + q_{1m}^2) \qquad (102)$$

$$s_m = \frac{q_{12}^2 - q_{1m}^2}{1 - q_{12}^2} \forall m \in \{3, \ldots, M\}. \qquad (103)$$

The code weight $\beta_2$ can be rewritten with (100) as $$\beta_2 = -s_1 - (1 + s_2) w_\phi - \sum_{m=3}^{M} (1 + s_m) \beta_m, \qquad (104)$$

such that the variance of the first linear combination is given by $$\sigma_A^2 = \sum_{m=1}^{M} \alpha_m^2 \sigma_\phi^2 + \beta_m^2 \sigma_{\rho_m}^2. \qquad (105)$$

The pure phase combination used for smoothing is characterized by its GF property, i.e.

$$\sum_{m=1}^{M} \alpha_{m'} = 0, \qquad (106)$$

and the ionosphere-preserving (IP) constraint, d.h.

$$\sum_{m=1}^{M} \alpha_{m'} q_{1m}^2 = 1 \qquad (107)$$

The GF and IP constraints are the basis for the derivation of the phase weight $\alpha_{1'}$ that is given by $$\alpha_{1'} = \frac{1}{1 - q_{12}^2} + \sum_{m=3}^{M} \frac{q_{12}^2 - q_{1m}^2}{1 - q_{12}^2} \cdot \alpha_{m'} = c_0 + c_1^T \alpha' \qquad (108)$$

with $\alpha' = [\alpha_{3'}, \ldots, \alpha_{M'}]^T$. The second phase weight $\alpha_{2'}$ is obtained similarly as $$\alpha_{2'} = -\frac{1}{1 - q_{12}^2} - \sum_{m=3}^{M} \frac{1 - q_{1m}^2}{1 - q_{12}^2} \alpha_{m'} = d_0 + d_1^T \alpha', \qquad (109)$$

such that $\sigma_B^2$ can be written as a function of $\alpha'$:

$$\sigma_B^2 = (c_0 + c_1^T \alpha')^2 \cdot \sigma_\phi^2 + (d_0 + d_1^T \alpha')^2 \cdot \sigma_\phi^2 + \alpha'^T \alpha' \cdot \sigma_\phi^2 \qquad (110)$$

The covariance $\sigma_{AB}$ is obtained using (97), (108) and (109), i.e.

$$\sigma_{AB} = \sum_{m=1}^{M} \alpha_m \alpha_{m'} \cdot \sigma_\phi^2 \qquad (111)$$

$$= \sum_{m=1}^{M} \frac{j_m \tilde{\lambda}}{\lambda_m} \cdot w_\phi \cdot \alpha_{m'} \cdot \sigma_\phi^2$$

$$= \frac{j_1 \tilde{\lambda}}{\lambda_1} \sigma_\phi^2 \cdot (c_0 + c_1^T \alpha') \cdot w_\phi + \frac{j_2 \tilde{\lambda}}{\lambda_2} \sigma_\phi^2 \cdot (d_0 + d_1^T \alpha') \cdot$$

$$w_\phi + \sum_{m=3}^{M} \frac{j_m \tilde{\lambda}}{\lambda_m} \sigma_\phi^2 \cdot \alpha_{m'} \cdot w_\phi$$

$$= (v_0 + v_1^T \alpha') \cdot w_\phi \cdot \sigma_\phi^2.$$

Therefore, the maximization of the ambiguity discrimination has to be performed only over the parameters $w_\phi$, $\beta_3, \ldots, \beta_M$ and $\alpha_{3'}, \ldots, \alpha_{M'}$. This optimization can be formulated by three additional constraints:

$$\frac{\partial D}{\partial w_\phi} \stackrel{!}{=} 0, \qquad (112)$$

and $$\frac{\partial D}{\partial \beta_m} \stackrel{!}{=} 0 \; \forall m \in \{3, \ldots, M\}, \qquad (113)$$

and $$\frac{\partial D}{\partial \alpha_m} \stackrel{!}{=} 0 \; \forall m \in \{3, \ldots, M\}. \qquad (114)$$

The first constraint is rewritten by the means of (93), (100)-(104), (110) and (11) as $$\kappa_1 \cdot \left[ \left( s_1 + s_2 w_\phi + \sum_{m=3}^{M} s_m \beta_m \right) \left( s_1 + \sum_{m=3}^{M} s_m \beta_m \right) \sigma_{\rho_1}^2 + \right. \qquad (115)$$

$$\left( -s_1 - (1 + s_2) w_\phi - \sum_{m=3}^{M} (1 + s_m) \beta_m \right)$$

$$\left. \left( -s_1 - \sum_{m=3}^{M} (1 - s_m) \beta_m \right) \sigma_{\rho_2}^2 + \sum_{m=3}^{M} \beta_m^2 \sigma_{\rho_m}^2 \right] +$$

$$\kappa_2 \cdot \sigma_\phi^2 \cdot \left[ (c_0 + c_1^T \alpha')^2 + (d_0 + d_1^T \alpha')^2 + \alpha'^T \alpha' \right] +$$

$$\kappa_3 \cdot (v_0 + v_1^T \alpha') \cdot w_\phi \cdot \sigma_\phi^2 = 0.$$

The second constraint is equivalent to $$s_m \sigma_{\rho_1}^2 \left( s_1 + s_2 w_\phi + \sum_{l=3}^{M} s_l \beta_l \right) - \qquad (116)$$

$$(1 + s_m) \sigma_{\rho_2}^2 \left( -s_1 - (1 + s_2) w_\phi - \sum_{l=3}^{M} (1 + s_l) \beta_l \right) + \beta_m \sigma_{\rho_m}^2 = 0,$$

and can be written in matrix-vector-notation as $$A \cdot [\beta_3, \ldots, \beta_M]^T + b \cdot w_\phi + c = 0 \qquad (117)$$

with $$A_{m,l} = s_l s_m \sigma_{\rho_1}^2 + (1+s_l)(1+s_m)\sigma_{\rho_2}^2 + \sigma_{\rho_m}^2 \delta(m-l)$$

$$b_m = s_2 s_m \sigma_{\rho_1}^2 + (1+s_m)(1+s_2)\sigma_{\rho_2}^2$$

$$c_m = s_1 s_m \sigma_{\rho_1}^2 - (1+s_m)(-s_1)\sigma_{\rho_2}^2 \qquad (118)$$

where $\delta(m-l)$ is 1 for $m=l$ and otherwise 0. Solving (117) for $\beta_m$ gives $$[\beta_3, \ldots, \beta_M]^T = -A^{-1}(c + b \cdot w_\phi) \qquad (119)$$

The derivative in the third constraint can be expanded to $$2\kappa_2 \cdot (c_0 c_{1,m} + d_0 d_{1,m})\sigma_\phi^2 + 2\kappa_2 (c_1^T c_{1,m} + d_1^T d_{1,m})\sigma_\phi^2 \cdot \alpha' + 2\kappa_2 v_1^2 \cdot \alpha_m + \kappa_3 v_{1,m} \sigma_\phi^2 \cdot w_\phi = 0 \qquad (120)$$

where $C_{1,m}$ and $d_{1,m}$ represent the $(m-2)$-th elements of $c_1$ and $d_1$. Equation (120) can be simplified to $$\zeta_m^T \alpha' + \delta_m w_\phi + \epsilon_m = 0 \ \forall m \in \{3, \ldots, M\} \qquad (121)$$

These $M-2$ constraints can be written in matrix-vector-notation as $$X \alpha' + \delta \cdot w_\phi + \epsilon = 0 \qquad (122)$$

with $$X = \begin{bmatrix} \zeta_3^T \\ \vdots \\ \zeta_M^T \end{bmatrix}, \delta = \begin{bmatrix} \delta_3 \\ \vdots \\ \delta_M \end{bmatrix}, \varepsilon = \begin{bmatrix} \varepsilon_3 \\ \vdots \\ \varepsilon_M \end{bmatrix}. \qquad (123)$$

Solving for $\alpha'$ yields $$\alpha' = -X^{-1}(\delta \cdot w_\phi + \epsilon) \qquad (124)$$

The code weight $\beta_m$ of (119) and the phase weight $\alpha_m$ of (124) are inserted into (115) to obtain a constraint which only includes $w_\phi$ as unknown, i.e.

$$\kappa_1 \cdot [(s_1 + s_2 w_\phi - t^T A^{-1}(c + b w_\phi))(s_1 - t^T A^{-1}(c + b w_\phi)) \cdot \sigma_{\rho_1}^2 + (-s_1 - (1+s_2)w_\phi + u^T A^{-1}(c + b w_\phi))(-s_1 + u^T A^{-1}(c + b w_\phi)) \cdot \sigma_{\rho_2}^2 + (c + b w_\phi)^T A^{-T} \Sigma A^{-1}(c + b w_\phi)] + \kappa_2 \cdot \sigma_\phi^2 \cdot [(c_0 - c_1^T X^{-1}(\delta w_\phi + \epsilon))^2 + (d_0 - d_1^T X^{-1}(\delta w_\phi + \epsilon))^2 + (\delta w_\phi + \epsilon)^T X^{-T} X^{-1}(\delta w_\phi + \epsilon)] + \kappa_3 \cdot [(v_0 - v_1^T X^{-1}(\delta w_\phi + \epsilon)) w_\phi \sigma_\phi^2]/2 = 0 \qquad (125)$$

which represent a quadratic equation in $w_\phi$. It can be shown that the quadratic terms cancel and a linear equation remains, i.e.

$$r_1 + r_2 \cdot w_\phi = 0 \qquad (126)$$

with $$r_1 = \kappa_1 \cdot [(s_1 - t^T A^{-1} c)^2 \cdot \sigma_{\rho_1}^2 + (-s_1 + u^T A^{-1} c)^2 \cdot \sigma_{\rho_2}^2 + c^T A^{-T} \Sigma A^{-1} c] + \kappa_2 \sigma_\phi^2 \cdot [c_0^2 - 2 c_0 c_1^T X^{-1} \epsilon + (c_1^T X^{-1} \epsilon)^2 + d_0^2 - 2 d_0 d_1^T X^{-1} \epsilon + (d_1^T X^{-1} \epsilon)^2 + \epsilon^T X^{-T} X^{-1} \epsilon] \qquad (127)$$

and $$r_2 = \kappa_1 \cdot [((s_1 - t^T A^{-1} c)(-t^T A^{-1} b) + (s_2 - t^T A^{-1} b)(s_1 - t^T A^{-1} c)) \cdot \sigma_{\rho_1}^2 + ((-s_1 + u^T A^{-1} c)(u^T A^{-1} b) - (1 + s_2 - u^T A^{-1} b)(-s_1 + u^T A^{-1} c)) \cdot \sigma_{\rho_2}^2 + (c^T A^{-T} \Sigma A^{-1} b + b^T A^{-T} \Sigma A^{-1} c)] + \kappa_2 \sigma_\phi^2 \cdot [-2 c_0 c_1^T X^{-1} \delta + 2 c_1^T X^{-1} \epsilon \cdot c_1^T X^{-1} \delta - 2 d_0 d_1^T X^{-1} \delta + 2 d_1^T X^{-1} \epsilon \cdot d_1^T X^{-1} \delta + 2 \epsilon^T X^{-T} X^{-1} \delta] + \kappa_3 \cdot [(v_0 - v_1^T X^{-1} \epsilon)\sigma_\phi^2]/2 \qquad (128)$$

Solving of (126) for $w_\phi$ gives the optimal overall phase weight:

$$w_{\phi_{opt}} = -\frac{r_1}{r_2}, \qquad (129)$$

which is then used in (119) and (124) to compute $\beta_m$, $m \in \{3, \ldots, M\}$, and $\alpha'$. Replacing of $\alpha'$ in (108) and (109) yields the remaining coefficients of the pure phase combination. The code weights $\beta_1$ and $\beta_2$ are determined with (100), (104) and the wavelength $\lambda = w_\phi \cdot \tilde{\lambda}$. The phase weights $\alpha_m$ of the mixed code carrier combination are then obtained from (97).

Table 1 shows the weighting coefficients and properties of the GF-IP smoothed multi-frequency mixed code carrier combination of maximum discrimination for various smoothing periods $\tau$. The weighting coefficients of the code carrier combination vary only slightly with $\tau$ while the coefficients of the pure phase combination show a strong dependency on $\tau$. A standard deviation of less than 5 cm for the ionospheric delay estimate ($\tau=20$ s) makes the ambiguity resolution ($\lambda=2.253$ m) extremely reliable.

The integer ambiguity estimation has to be validated. The validation is performed by comparing the previously obtained ambiguity estimates with the ambiguity estimates from an alternative, geometry-free approach. A geometry-free, ionosphere-free linear combination eliminates the ranges, clock offsets, tropospheric and ionospheric delays, and thus, provides a direct estimate of the combination ambiguities, i.e.

$$\hat{N} = \sum_{m=1}^{M} \alpha_m \lambda_m \varphi_m + \beta_m \rho_m \qquad (130)$$

$$= \sum_{m=1}^{M} \alpha_m \lambda_m N_m + \sum_{m=1}^{M} (\alpha_m \varepsilon_m + \beta_m \eta_m)$$

$$= \lambda N + \sum_{m=1}^{M} (\alpha_m \varepsilon_m + \beta_m \eta_m),$$

where the weighting coefficients $\alpha_m$ and $\beta_m$ are constrained by the geometry-free condition $$\sum_{m=1}^{M} \alpha_m + \beta_m = 0, \qquad (131)$$

the ionosphere-free requirement, i.e.

$$\sum_{m=1}^{M} (\alpha_m - \beta_m) q_{1m}^2 = 0, \qquad (132)$$

and the integer preserving condition, i.e.

$$\sum_{m=1}^{M} \alpha_m \lambda_m N_m = \lambda N. \qquad (133)$$

The latter condition is automatically fulfilled as the GF and IF constraints are fulfilled for an arbitrary wavelength $\lambda$. It is a scaling factor which affects both wavelength and standard deviation of the combined noise. Thus, all degrees of freedom are used to minimize the noise variance $\sigma=\sqrt{\Sigma_{m=1}^{M}\alpha_m^2\sigma_{\Phi_m}^2+\beta_m^2\sigma\rho_m^2}$. The geometry-free approach resolves the ambiguities for each satellite individually, i.e. no benefit is taken from the satellite redundancy. However, there are two substantial advantages of the geometry-free approach: First, the elimination of tropospheric delay makes it robust with respect to any modeling errors. Secondly, the worst-case bias accumulation over all satellites is prevented due to an independent ambiguity resolution for each satellite. The variance of the GF-IF linear combination can be further improved by a carrier smoothing. The weighting coefficients of both the GF-IF code-carrier and the GF-IF phase-only combination are jointly optimized to minimize the combination noise variance for a predefined smoothing period $\tau$. The optimization follows the same approach as in the previous section except that the ionosphere-preserving constraint is replaced by the ionosphere-free constraint. Tab. 2 shows the optimized weighting coefficients of triple frequency E1-E5b-E5a combinations. The wavelength of the code carrier combination has been set to 1 m which results in a standard deviation of only 4 cm for a 20 s smoothing. The $j_m$, $\alpha_m$ and $\beta_m$ refer to the weighting coefficients of the code carrier combination and the $\alpha_{m'}$ denote the weighting coefficients of the phase-only combination used for smoothing.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith.

TABLE 1

Triple frequency (E1-E5b-E5a) GF-IP-NP carrier smoothed code-carrier widelane combinations for ionospheric delay estimation with $\sigma_\phi$ = 2 mm and $\sigma_{\rho_m}$ = 3 · $\Gamma_m$.

| $\tau$ | $j_1, \alpha_1, \alpha_{1'}$ | $j_2, \alpha_2, \alpha_{2'}$ | $j_3, \alpha_3, \alpha_{3'}$ | $\beta_1$ | $\beta_2$ | $\beta_3$ | $\lambda$ [m] | $\sigma_{\bar{A}}$[cm] | D |
|---|---|---|---|---|---|---|---|---|---|
| 20 | 1<br>14.210<br>−1.376 | −2<br>−21.776<br>1.021 | 1<br>10.611<br>0.355 | −0.630 | −1.211 | −1.203 | 2.704 | 7.3 | 18.49 |
| 20 | 1<br>13.663<br>−1.406 | −3<br>−31.408<br>1.288 | 2<br>20.406<br>0.118 | −0.554 | −1.057 | −1.049 | 2.704 | 6.4 | 20.09 |
| 20 | 1<br>13.157<br>−1.434 | −4<br>−40.327<br>1.535 | 3<br>29.476<br>−0.101 | −0.484 | −0.915 | −0.907 | 2.503 | 5.7 | 21.80 |
| 20 | 1<br>12.687<br>−1.461 | −5<br>−48.609<br>1.765 | 4<br>37.899<br>−0.304 | −0.419 | −0.783 | −0.775 | 2.414 | 5.1 | 23.56 |
| 20 | 1<br>12.250<br>−1.485 | −6<br>−56.320<br>1.979 | 5<br>45.740<br>−0.494 | −0.358 | −0.660 | −0.652 | 2.331 | 4.6 | 25.22 |
| 20 | 1<br>11.842<br>−1.507 | −7<br>−63.517<br>2.178 | 6<br>53.059<br>−0.670 | −0.301 | −0.545 | −0.537 | 2.253 | 4.2 | 26.58 |
| 60 | 1<br>11.882<br>−1.382 | −7<br>−63.732<br>1.070 | 6<br>53.239<br>0.311 | −0.307 | −0.545 | −0.536 | 2.261 | 2.4 | 45.99 |

TABLE 2

Triple frequency (E1-E5b-E5a) GF-IF-NP carrier smoothed code-carrier widelane combinations for integer ambiguity estimation: The wavelength has been set to $\lambda$ = 1 m; the noise assumptions are $\sigma_\phi$ = 2 mm and $\sigma_{\rho_m}$ = 3 · $\Gamma_m$.

| $\tau$ | $j_1, \alpha_1, \alpha_{1'}$ | $j_2, \alpha_2, \alpha_{2'}$ | $j_3, \alpha_3, \alpha_{3'}$ | $\beta_1$ | $\beta_2$ | $\beta_3$ | $\sigma_{\bar{A}}$[cm] | D |
|---|---|---|---|---|---|---|---|---|
| 20 | 1<br>5.255<br>−0.045 | −4<br>−16.106<br>0.397 | 3<br>11.773<br>−0.352 | −0.718 | −0.183 | −0.045 | 4.0 | 12.64 |
| 20 | 1<br>5.255<br>−0.058 | −5<br>−20.133<br>0.507 | 4<br>15.697<br>−0.449 | −0.717 | −0.135 | 0.033 | 4.0 | 12.63 |
| 20 | 1<br>5.255<br>−0.070 | −6<br>−24.160<br>0.617 | 5<br>19.621<br>−0.547 | −0.717 | −0.087 | 0.087 | 4.0 | 12.53 |
| 20 | 1<br>5.255<br>−0.082 | −7<br>−28.186<br>0.726 | 6<br>23.545<br>−0.644 | −0.716 | −0.039 | 0.141 | 4.1 | 12.53 |

TABLE 2-continued

Triple frequency (E1-E5b-E5a) GF-IF-NP carrier smoothed code-carrier widelane combinations for integer ambiguity estimation: The wavelength has been set to $\lambda = 1$ m; the noise assumptions are $\sigma_{\phi} = 2$ mm and $\sigma_{\rho_{nr}} = 3 \cdot \Gamma_m$.

| τ | $j_1, \alpha_1, \alpha_{1'}$ | $j_2, \alpha_2, \alpha_{2'}$ | $j_3, \alpha_3, \alpha_{3'}$ | $\beta_1$ | $\beta_2$ | $\beta_3$ | $\sigma_{\tilde{n}}$[cm] | D |
|---|---|---|---|---|---|---|---|---|
| 60 | 1 | −4 | 3 | −0.718 | −0.183 | −0.045 | 2.3 | 22.07 |
|  | 5.255 | −16.106 | 11.773 |  |  |  |  |  |
|  | −0.015 | 0.128 | −0.113 |  |  |  |  |  |

REFERENCES

[1] R. Hatch, The Synergism of GPS Code and Carrier Measurements, *Proc. Third Intern. Geodetic Symp. on Satellite Doppler Positioning*, New Mexico, II, pp. 1213-1232, 1982.

[2] P. Hwang, G. Graw and J. Bader, Enhanced Differential GPS Carrier-Smoothed Code Processing Using Dual-Frequency Measurements, *J. of Navigation*, vol. 46, No. 2, pp. 127-137, Summer 1999.

[3] G. Mc Graw and P. Young, Dual Frequency Smoothing DGPS Performance Evaluation Studies, *Proc. of ION National Technical Meeting*, San Diego (Calif.), USA, pp. 16-24, January 2005.

[4] C. Günther and P. Henkel, Reduced noise, ionosphere-free carrier smoothed code, *accepted for IEEE Transactions on Aerospace and Electronic Systems*, 2008.

[5] S. Schlötzer, High integrity carrier phase based relative positioning for precise landing using a robust nonlinear filter, *Master Thesis*, Technische Universität München, 174 pp, February 2009.

[6] R. Brown and P. Hwang, Introduction to random signals and applied Kalman filtering, 3rd edition, John Wiley and Sons, New York, 1997.

[7] P. Teunissen, Integer estimation in the presence of biases, *Journal of Geodesy*, vol. 75, pp. 399-407, 2001.

What is claimed is:

1. A method for determining phase components of carrier signals emitted by satellites of a satellite navigation system, comprising the acts:
   the carrier signals are received from various satellites by a user system,
   the integer phase ambiguities of the carrier signals received from the satellites are resolved in a fixing sequence selected
   to maximize the number of resolvable phase ambiguities by selecting the sequence based on a predefined threshold on the probability of wrong resolution of phase ambiguities and a predefined upper bound on the environmental measurement biases.

2. The method according to claim 1,
   wherein resolving the phase ambiguities depends on information on instrumental code and phase biases, that have been determined previously by:
   measuring phase and code signal by a plurality of reference stations;
   performing a least-square estimation of linear independent ranges, ionospheric errors, receiver biases and satellite biases for at least two epochs;
   performing a real valued ambiguity estimation by using a Kalman filter initialized by the previously least-square estimation of the ranges, ionospheric errors and receiver biases and satellites biases and further initialized by range rates, that has been calculated from a difference of the estimated ranges of different epochs;
   sequential determination of the integer valued ambiguities based on the previously estimated real valued ambiguities once the probability of wrong fixing drops below a predefined threshold;
   performing an estimation of receiver biases and satellite biases for both code and phase measurements by using a Kalman filter initialized by previously estimated linear independent ranges, range rates, ionospheric errors and receiver biases and satellite biases and predefined values for the unresolved linear dependent receiver and satellite biases.

3. The method according to claim 2,
   wherein MR receiver biases, M(K−1) satellite biases and MKR−MR−M(K−1) ambiguities are linear independent for a number M of frequencies, a number K of satellites and a number R of receivers.

4. The method according to claim 1,
   wherein the integer ambiguities of the user system are determined based on previously determined biases.

5. The method according to claim 1,
   the selection of the fixing sequence is performed by:
   using a search tree for determining the fixing sequence, the search tree comprising a plurality of branches representing various sequences of satellites that are arranged along branches of the search tree,
   determining the length of the branch by determining the probability of wrong fixing for each node of the search tree, wherein the search along the branch of the search tree is terminated if the probability of wrong fixing exceeds a preset limit and wherein the length of a particular branch depends on the number of nodes passed until the search along a branch is terminated, and by
   selecting the fixing sequence associated with the branch having the greatest length.

6. The method according to claim 5,
   wherein the fixing sequence is searched assuming a unidirectional accumulation of environmental biases from the selected satellites and an elevation dependent exponential profile of the bias magnitudes.

7. The method according to claim 5,
   wherein the search for the fixing sequence is preformed without, with partial or full integer decorrelation of the float ambiguities.

8. The method according to claim 1,
   wherein an azimuthal separation between the satellites of subsequent resolutions of the phase ambiguities exceeds a preset lower limit and/or wherein the lower limit is reduced with the number of checked nodes along a branch of the search tree.

9. The method according to claim 8,
   wherein the received carrier signals and further received code signals are combined into a multi-frequency, geometry preserving, ionosphere-free, integer preserving code-carrier combination and a multi-frequency, geometry-preserving, ionosphere-free, code-only combination for the sequential resolving of the phase ambiguities.

10. The method according to claim 9,
wherein the multi-frequency code-carrier combination and the code-only combination are smoothed by a multi-frequency carrier-only combination resulting in a smoothed code-carrier multi-frequency combination and code-only combination for the sequential resolving of the phase ambiguities.

11. The method according to claim 10,
wherein weighting coefficients of the geometry-preserving, ionosphere-free, integer preserving code-carrier combination are selected maximizing the ratio of the wavelength and the standard deviation of smoothed code-carrier combination for the sequential resolving of the phase ambiguities.

12. The method according to claim 9,
wherein the resolved ambiguities are validated using ambiguities obtained from a geometry-free, ionosphere-free carrier smoothed multi-frequency code-carrier combination.

13. The method according to claim 9,
wherein the resolved phase ambiguities are removed from an geometry-free, ionosphere preserving, integer preserving, mixed code-carrier combination of multi-frequency code and carrier signals that comprises the same ambiguity combination as the geometry preserving, ionosphere-free, integer preserving code-carrier combination.

14. The method according to claim 13,
wherein the multi-frequency geometry-free, ionosphere preserving, integer preserving, mixed code-carrier combination is smoothed by a multi-frequency carrier-only combination resulting in a smoothed code-carrier multi-frequency combination.

15. The method according to claim 14,
wherein the weighting coefficients of the geometry-free ionosphere preserving, integer preserving code-carrier combination are selected maximizing the ratio of the wavelength and the standard deviation of the smoothed code-carrier combination that comprises the same ambiguity combination as the geometry preserving, ionosphere-free, integer preserving code-carrier combination.

16. A user system for satellite navigation comprising:
a receiver for receiving carrier signals emitted by satellites of a satellite navigation system and
a signal processor for resolving integer phase ambiguities of the carrier signals received from the satellites in a fixing sequence selected
to maximize the number of resolvable phase ambiguities
  selecting the sequence based on a predefined threshold on the probability of wrong resolution of phase ambiguities and a predefined upper bound on the environmental measurement biases.

17. The user system according to claim 16,
wherein resolving the phase ambiguities depends on information on instrumental code and phase biases, that have been determined previously by:
  measuring phase and code signal by a plurality of reference stations;
  performing a least-square estimation of linear independent ranges, ionospheric errors, receiver biases and satellite biases for at least two epochs;
  performing a real valued ambiguity estimation by using a Kalman filter initialized by the previously least-square estimation of the ranges, ionospheric errors and receiver biases and satellites biases and further initialized by range rates, that has been calculated from a difference of the estimated ranges of different epochs;
  sequential determination of the integer valued ambiguities based on the previously estimated real valued ambiguities once the probability of wrong fixing drops below a predefined threshold;
  performing an estimation of receiver biases and satellite biases for both code and phase measurements by using a Kalman filter initialized by previously estimated linear independent ranges, range rates, ionospheric errors and receiver biases and satellite biases and predefined values for the unresolved linear dependent receiver and satellite biases.

18. The user system according to claim 17,
the selection of the fixing sequence is performed by:
using a search tree for determining the fixing sequence, the search tree comprising a plurality of branches representing various sequences of satellites that are arranged along branches of the search tree,
determining the length of the branch by determining the probability of wrong fixing for each node of the search tree, wherein the search along the branch of the search tree is terminated if the probability of wrong fixing exceeds a preset limit and wherein the length of a particular branch depends on the number of nodes passed until the search along a branch is terminated, and by
selecting the fixing sequence associated with the branch having the greatest length.

19. A method for retrieving instrumental code and phase biases, comprising the acts:
measuring phase and code signal by a plurality of reference stations;
performing a least-square estimation of linear independent ranges, ionospheric errors, receiver biases and satellite biases for at least two epochs;
performing a real valued ambiguity estimation by using a Kalman filter initialized by the previously least-square estimation of the ranges, ionospheric errors and receiver biases and satellites biases and further initialized by range rates, that has been calculated from a difference of the estimated ranges of different epochs;
sequential determination of the integer valued ambiguities based on the previously estimated real valued ambiguities once the probability of wrong fixing drops below a predefined threshold;
performing an estimation of receiver biases and satellite biases for both code and phase measurements by using a Kalman filter initialized by previously estimated linear independent ranges, range rates, ionospheric errors and receiver biases and satellite biases and predefined values for the unresolved linear dependent receiver and satellite biases.

* * * * *